(12) United States Patent
Robinson

(10) Patent No.: US 10,816,334 B2
(45) Date of Patent: Oct. 27, 2020

(54) AUGMENTED REALITY MEASUREMENT AND SCHEMATIC SYSTEM INCLUDING TOOL HAVING RELATIVELY MOVABLE FIDUCIAL MARKERS

(71) Applicant: Microsoft Technology Licensing, LLC, Redmond, WA (US)

(72) Inventor: Jonathan Steven Robinson, Haslemere (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 104 days.

(21) Appl. No.: 15/830,906

(22) Filed: Dec. 4, 2017

(65) Prior Publication Data

US 2019/0170510 A1 Jun. 6, 2019

(51) Int. Cl.

| G01B 21/00 | (2006.01) |
|---|---|
| G06T 19/00 | (2011.01) |
| G06T 7/73 | (2017.01) |
| G02B 27/01 | (2006.01) |
| G01C 15/06 | (2006.01) |

(Continued)

(52) U.S. Cl.
CPC ............... *G01B 21/00* (2013.01); *G01C 9/00* (2013.01); *G01C 15/06* (2013.01); *G02B 27/017* (2013.01); *G06F 3/011* (2013.01); *G06T 7/73* (2017.01); *G06T 19/006* (2013.01); *G02B 2027/0141* (2013.01); *G06T 2207/30208* (2013.01)

(58) Field of Classification Search
CPC .......... G01B 21/00; G01C 9/00; G01C 15/06; G02B 27/017; G02B 2027/0141; G06T 7/73; G06T 19/006; G06T 2207/30208; G06F 3/011
See application file for complete search history.

(56) References Cited

U.S. PATENT DOCUMENTS

| 9,123,171 B1 | 9/2015 | Chavez et al. |
|---|---|---|
| 2002/0158873 A1 | 10/2002 | Williamson |

(Continued)

FOREIGN PATENT DOCUMENTS

| EP | 3220098 A1 | 9/2017 |
|---|---|---|
| GB | 2452033 A | 2/2009 |

(Continued)

OTHER PUBLICATIONS

"Microsoft HoloLens: Partner Spotlight with thyssenkrupp", Retrieved from>>https://www.youtube.com/watch?v=IgtHnCJJUMU>>, Apr. 20, 2017, 2 Pages.

Evertt, et al., "Mixed Reality Measurement with Peripheral Tool", Application As Filed in U.S. Appl. No. 15/595,857, filed May 15, 2017, 34 Pages.

"International Search Report and Written Opinion Issued in PCT Patent Application No. PCT/US18/062363", dated Feb. 11, 2019, 12 Pages.

(Continued)

*Primary Examiner* — Elias Desta
(74) *Attorney, Agent, or Firm* — Arent Fox LLP

(57) ABSTRACT

Aspects of the present disclosure include apparatus, method, and computer readable medium for identifying a first geometric position of a first point in space and one or more second geometric positions of one or more respective second points in space associated with placement of the first tool member and a second tool member of a measurement tool, generating a final dimension of a part of the real-world structure based on at least the one or more second geometric positions according to relative geometric relationship with respect to the first point, and displaying a virtual schematic diagram of the real-world structure having the final dimension.

20 Claims, 17 Drawing Sheets

(51) Int. Cl.
*G01C 9/00* (2006.01)
*G06F 3/01* (2006.01)

(56) References Cited

U.S. PATENT DOCUMENTS

| | | |
|---|---|---|
| 2012/0050281 A1 | 3/2012 | Tanaka et al. |
| 2012/0280988 A1 | 11/2012 | Lampotang et al. |
| 2013/0050070 A1 | 2/2013 | Lewis et al. |
| 2013/0262152 A1 | 10/2013 | Collins et al. |
| 2013/0293530 A1 | 11/2013 | Perez et al. |
| 2013/0323700 A1 | 12/2013 | Samosky et al. |
| 2014/0071165 A1 | 3/2014 | Tuchschmid et al. |
| 2014/0132733 A1 | 5/2014 | Mundhenk et al. |
| 2015/0176972 A1* | 6/2015 | Tait .................... G01B 5/008 33/503 |
| 2015/0235367 A1 | 8/2015 | Langer et al. |
| 2015/0238276 A1 | 8/2015 | Atarot et al. |
| 2015/0356737 A1 | 12/2015 | Ellsworth et al. |
| 2016/0106508 A1 | 4/2016 | Lathrop et al. |
| 2016/0147408 A1 | 5/2016 | Bevis et al. |
| 2016/0148433 A1 | 5/2016 | Petrovskaya et al. |
| 2016/0163063 A1 | 6/2016 | Ashman |
| 2016/0178406 A1* | 6/2016 | Wang .................... G01C 15/06 250/231.1 |
| 2016/0242744 A1 | 8/2016 | Mihailescu et al. |
| 2017/0052507 A1 | 2/2017 | Poulos et al. |
| 2018/0173404 A1 | 6/2018 | Smith |
| 2018/0286127 A1* | 10/2018 | Evertt .................... G06T 11/206 |
| 2020/0018971 A1 | 1/2020 | Evertt et al. |

FOREIGN PATENT DOCUMENTS

| | | |
|---|---|---|
| WO | 2015176163 A1 | 11/2015 |
| WO | 2016112383 A1 | 7/2016 |
| WO | 2016130895 A1 | 8/2016 |

OTHER PUBLICATIONS

"Bridge", Retrieved from: http://web.archive.org/web/20161212222829/https:/bridge.occipital.com/, Dec. 12, 2016, 13 Pages.

"Final Office Action Issued in U.S. Appl. No. 15/595,857", dated Nov. 27, 2018, 27 Pages.

"Non Final Office Action Issued in U.S. Appl. No. 15/595,857", dated Jul. 27, 2018, 21 Pages.

"Non Final Office Action Issued in U.S. Appl. No. 16/584,430", dated May 18, 2020, 18 Pages.

Bae, et al., "Fast and Scalable Structure-From-Motion Based Localization for High-Precision Mobile Augmented Reality Systems", In Journal of Mobile User Experience, vol. 5, Issue 4, Jul. 19, 2016, 21 Pages.

Bubnik, et al., "Light Chisel: 6DOF Pen Tracking", In Proceedings of 36th Annual Conference of the European Association for Computer Graphics, vol. 34, No. 4, May 4, 2015, 12 Pages.

"International Search Report and Written Opinion Issued in PCT Application No. PCT/US2018/024693", dated Jun. 12, 2018, 10 Pages.

"Final Office Action Issued in U.S. Appl. No. 16/584,430", dated Aug. 26, 2020, 23 Pages.

* cited by examiner

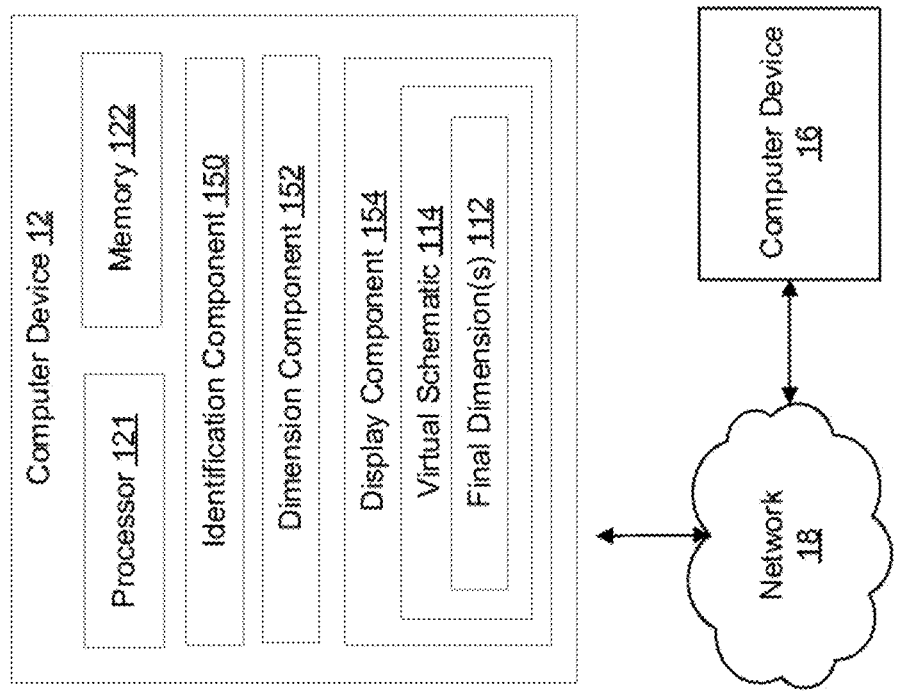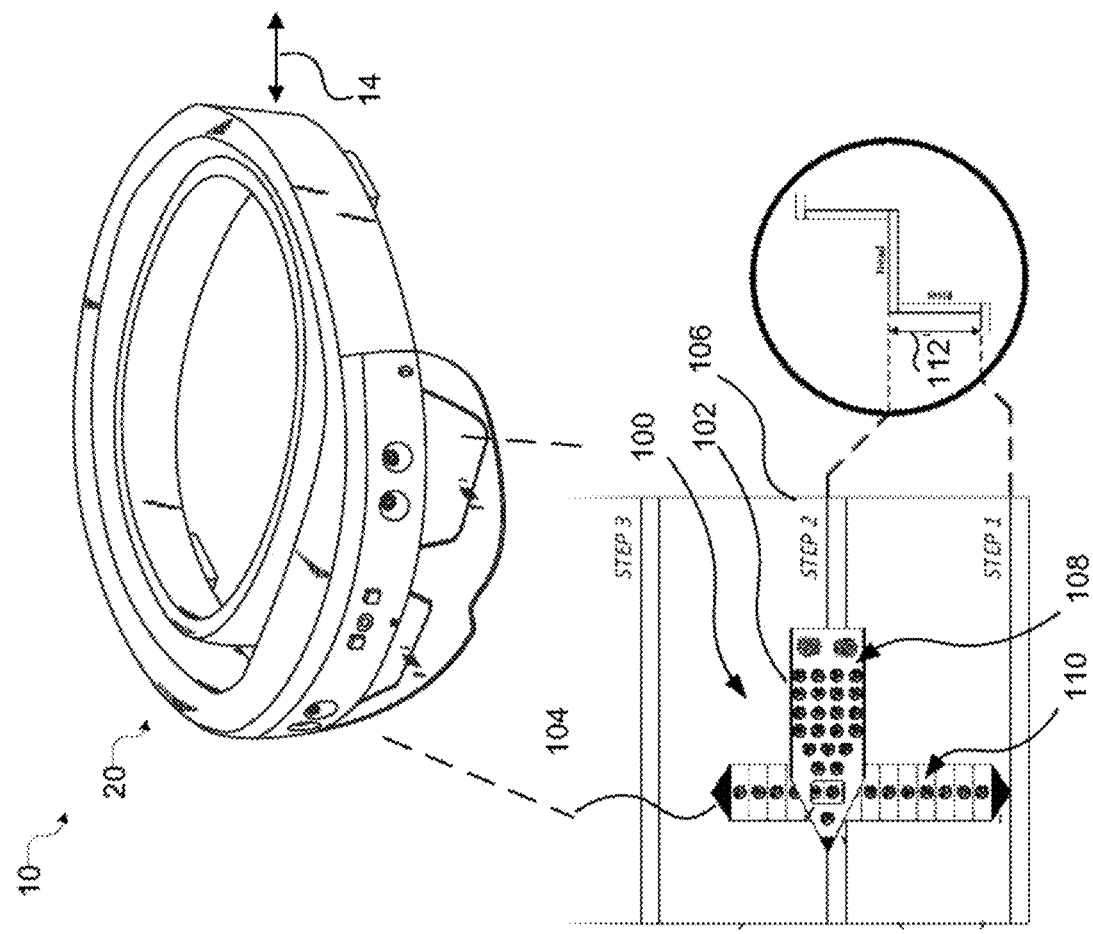
FIG. 1

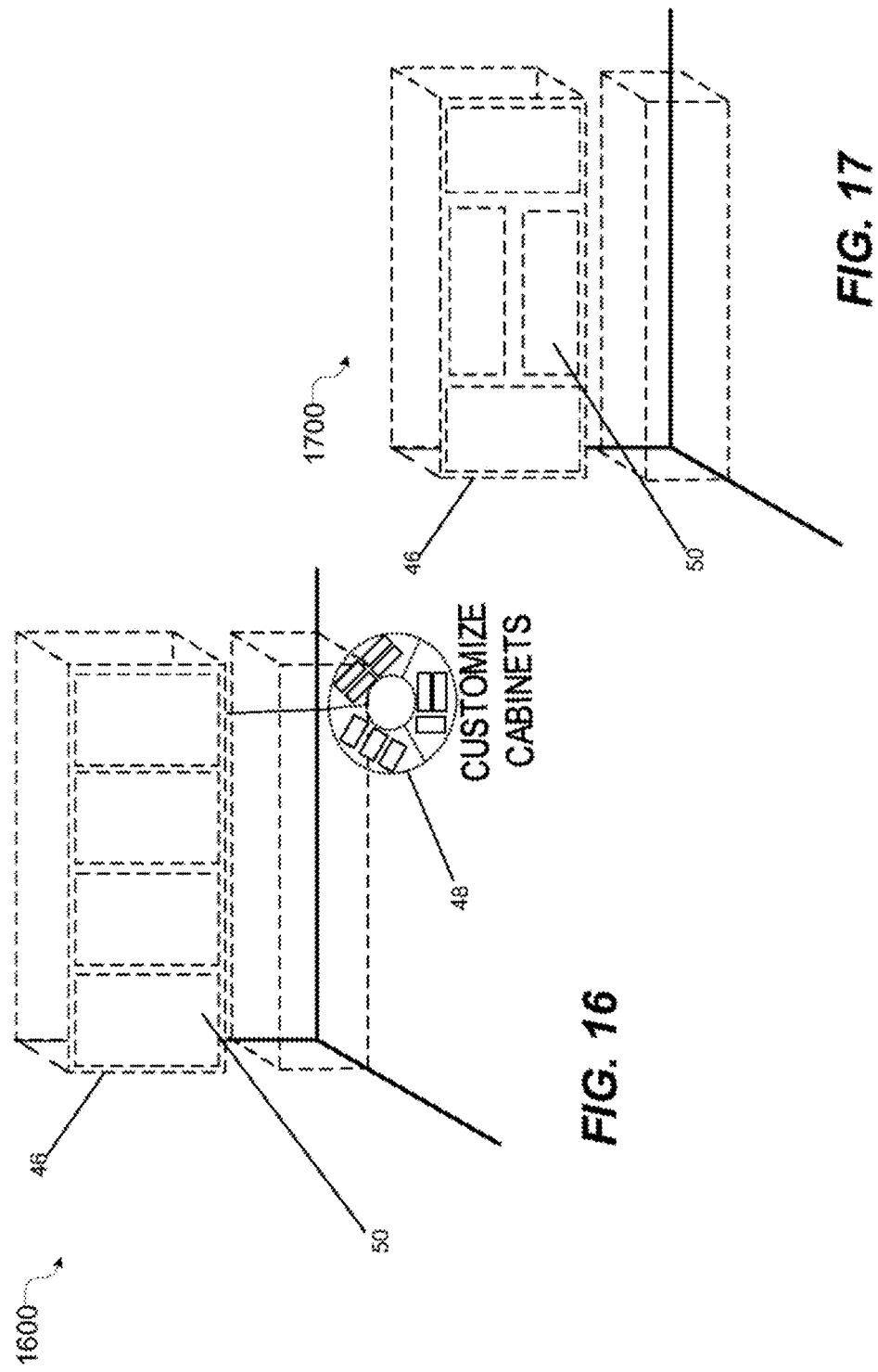

AUGMENTED REALITY MEASUREMENT AND SCHEMATIC SYSTEM INCLUDING TOOL HAVING RELATIVELY MOVABLE FIDUCIAL MARKERS

BACKGROUND

Virtual reality (VR) and augmented reality (AR) visualization systems are starting to enter the mainstream consumer electronics marketplace. AR Head-Mounted Display (HMD) devices are one promising use of such technology. These devices may include transparent display elements that enable a user to see virtual content transposed over the user's view of the real-world. Virtual content that appears to be superimposed over the user's real-world view is commonly referred to as AR content. Displayed AR objects are often referred to as "holographic" objects. VR and AR visualization systems can provide users with entertaining or useful, immersive three-dimensional (3D) virtual environments in which they can visually (and sometimes audibly) experience things they might not normally experience in real life.

AR systems may be used for measuring real-world structures, however, improvements in AR measurement systems may be desired.

SUMMARY

The following presents a simplified summary of one or more features described herein in order to provide a basic understanding of such features. This summary is not an extensive overview of all contemplated features, and is intended to neither identify key or critical elements of all features nor delineate the scope of any or all implementations. Its sole purpose is to present some concepts of one or more features in a simplified form as a prelude to the more detailed description that is presented later.

Aspects of the present disclosure include an apparatus configured to identify a first geometric position of a first point in space of a first tool member and one or more second geometric positions of one or more respective second points in space of a second tool member associated with placement of the first tool member and a second tool member of the measurement tool relative to a real-world structure. The apparatus, method, and computer readable medium are further configured to generate a final dimension of a part of the real-world structure based on at least the one or more second geometric positions according to a relative geometric relationship with respect to the first point, and to display a virtual schematic diagram of the real-world structure having the final dimension.

Aspects of the present disclosure include a computer-readable medium having instructions stored in a memory that, when executed by one or more processors associated with a head-mounted display device, cause the one or more processors to cause one or more sensors to identify a first geometric position of a first point in space indicated by a first plurality of fiducial markers of a first tool member of a measurement tool, one or more second geometric positions of one or more respective second points in space associated with placement of the first tool member and a second tool member of the measurement tool relative to a surface of a real-world structure, wherein the second tool member includes a second plurality of fiducial markers each indicating a respective second point in space relative to the second tool member, wherein the first geometric position and the one or more second geometric positions are in a coordinate system relative to the head-mounted display device, generate a final dimension of a part of the real-world structure based on at least the one or more second geometric positions according to relative geometric relationship with respect to the first point, and cause a near-eye display configured to display a virtual schematic diagram of the real-world structure having the final dimension.

Aspects of the present disclosure include a method of measuring a dimension of a real-world structure and generating a schematic using a head-mounted display device including identifying a first geometric position of a first point in space indicated by a first plurality of fiducial markers of a first tool member of a measurement tool, identifying one or more second geometric positions of one or more respective second points in space associated with placement of the first tool member and a second tool member of the measurement tool relative to a surface of a real-world structure, wherein the second tool member includes a second plurality of fiducial markers each indicating a respective second point in space relative to the second tool member and wherein the first geometric position and the one or more second geometric positions are in a coordinate system relative to the head-mounted display device, generating a final dimension of a part of the real-world structure based on at least the one or more second geometric positions according to relative geometric relationship with respect to the first point, displaying a virtual schematic diagram of the real-world structure having the final dimension.

The foregoing has outlined rather broadly the features and technical advantages of examples in order that the detailed description that follows may be better understood. Additional features and advantages will be described hereinafter. The conception and specific examples disclosed may be readily utilized as a basis for modifying or designing other structures for carrying out the same purposes of the present application. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

FIG. 1 is a schematic diagram of an example of an AR measurement and schematic-generation system including an HMD device using a measurement tool to measure one or more dimensions of a real-world structure in an environment.

FIG. 16 is an image of an example holographic user interface for selecting style options on an example holographic structure, where the holographic structure is in a first style configuration.

FIG. 17 is an image of a holographic in a second style configuration after receiving a selection in the holographic user interface.

DETAILED DESCRIPTION

Figure 2:
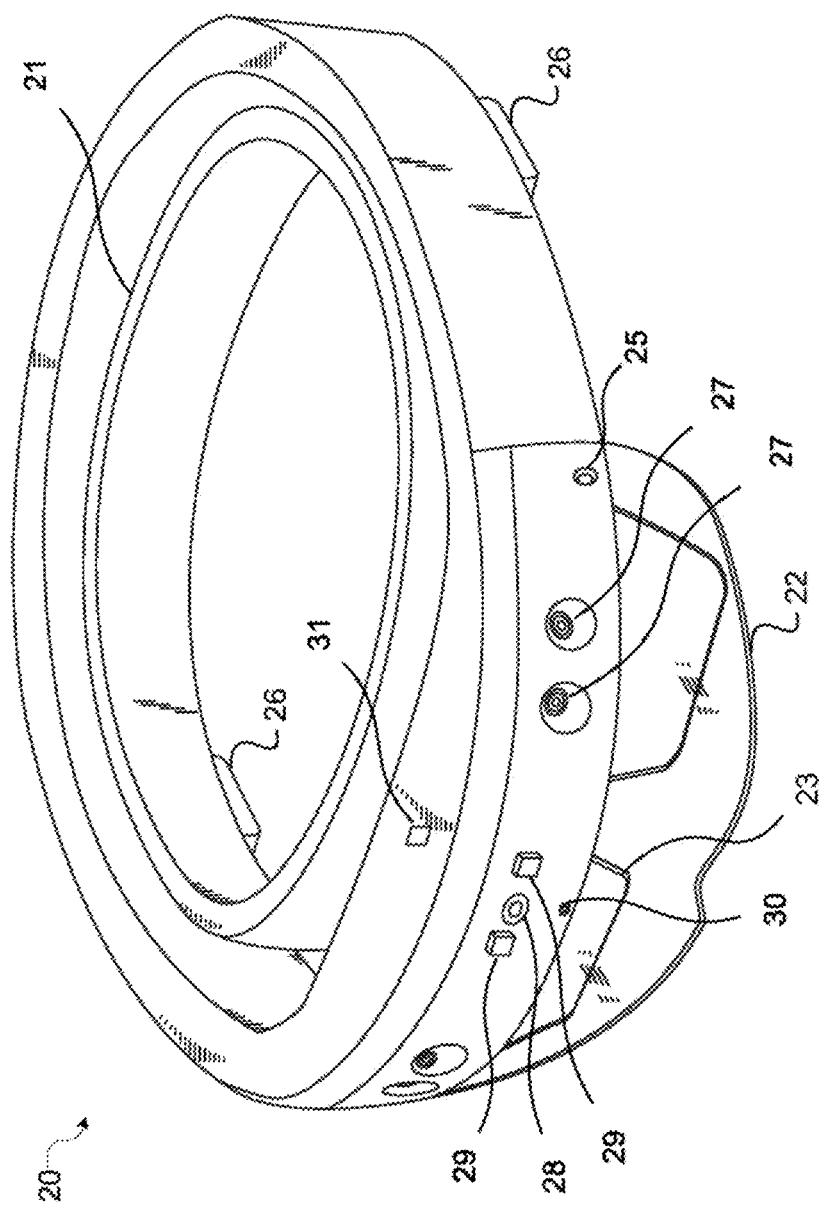
FIG. 2 is a perspective view of an example of the HMD device.

The present disclosure relates to using fiducial markers on a measurement tool to directly identify a measurement, and/or to validate and/or improve an accuracy of a dimension of a real-world object measured by an AR system, such as an HMD device. The HMD device may include sensors (e.g. image cameras and depth cameras) to detect the measurement tool and corresponding sets of relatively movable fiducial markers placed in an orientation to measure one or more dimensions of the real-world object. The measurement tool may include a first tool member having a first plurality of fiducial markers that indicate a position of a first point in space relative to the first tool member, and a second tool member movable relative to the first tool member and having a second plurality of fiducial markers. Each of the second plurality of fiducial markers indicates a respective position of one of a plurality of second points in space relative to the second tool member. Also, due to being relatively movable, the first tool member and the second tool member have a plurality of relative positions each having a corresponding relative geometric relationship between the first point and the second point. The measurement may include identifying the fiducial markers on each of the first tool member and the second tool member, which indicate measurement values. By reading the fiducial markers on the second member of the measurement tool, a determination of a position of the first point of the first tool member can be verified or over-written. Thus, the HMD device may use the measurement values associated with one or both sets of the fiducial markers to directly measure, or to deduce, one or more dimensions of the real-world object, which may improve or validate an accuracy in the HMD device-determined position of the first point corresponding to the dimension of the real-world object.

Referring to FIG. 1, an example augmented reality (AR) measurement and schematic system 10 includes an HMD device 20 that detects positions and/or relative positions of movably positionable first and second tool members 102 and 104 of a measurement tool 100 to measure one or more dimensions of a real-world structure 106. In the illustrated example, the HMD device 20 may be configured to communicate data to and from an external computer device 12 through a connection 14, which may be a wired connection, a wireless connection, or a combination thereof. In other examples, however, the HMD device 20 may operate as a standalone device that includes the functionality of the computer device 12 described herein. The connection 14 may be configured to carry any kind of data, such as image data (e.g., still images and/or full-motion video, including 2D and 3D images), audio data (including voice), multimedia, and/or any other type(s) of data. The computer device 12 may be a game console, a personal computer, a tablet computer, a smartphone, or other type of processing device. The connection 14 may be a wired or wireless connection, such as but not limited to a universal serial bus (USB) connection, Wi-Fi connection, Bluetooth or Bluetooth Low Energy (BLE) connection, Ethernet connection, cable connection, digital subscriber line (DSL) connection, cellular connection (e.g., 3G, LTE/4G or 5G), or other suitable connections. Additionally, the computer device 12 may communicate with one or more other computer devices 16 via a network 18, which may include a local area network (LAN), a wide area network (WAN), a cellular network, a WiFi network, a satellite network, an intranet, a metropolitan area network (MAN), the global Internet, a wired network, a wireless network, or any combination thereof.

The HMD device 20 and/or computer device 12 includes an identification component 150 that may operate in conjunction with a processor 121 and a memory 122 to identify various geometric points or dimensions in space of the real-world structure 106 based on the positioning of the first and second tool members 102 and 104 when placed on or adjacent to the real-world structure 106. In particular, each of the first and second tool members 102 and 104 includes a respective set of fiducial markers 108 and 110, where combinations of fiducial markers or individual fiducial markers correspond to one or more points or edges each having a known position on the first and second tool members 102 and 104. In other words, each fiducial marker or some combination of fiducial markers in each of respective set of fiducial markers 108 and 110 may have a known geometric relationship with one or more points and/or edges of the corresponding tool member. As such, by identifying a position of one or a combination of respective fiducial marks, the HMD device 20 may deduce a position of a point or edge of the corresponding tool member. For example, the identification component 150 may identify one or more fiducial markers on each of the sets fiducial markers 108 and 110, and hence may identify a position of a corresponding point or edge on the first and second tool members 102 and 104 of the measurement tool 100 in a coordinate system of the HMD device 20. The dimension component 152 may operate in conjunction with the processor 121 and the memory 122 to generate one or more final dimensions of one or more parts of the real-world structure 106. For example, the dimension component 152 may generate a height measurement as one of the final dimensions 112 based on the relative positions of the corresponding points identified by the one or more fiducial markers of each of the sets of fiducial markers 108 and 110 on the measurement tool 100. The display component 154 may operate in conjunction with the processor 121 and the memory 122 to display a virtual schematic diagram 114 of the real-world structure 106 having the one or more final dimensions 112. For example, the display component 154 may input the one or more final dimensions 112 into the virtual schematic diagram 114. The virtual schematic diagram 114 may be used to generate a copy of the real-world structure 106, and/or other real-world objects that have one or more dimensions that may depend on the one or more final dimension 112 of the real-world structure 106.

Referring to FIG. 2, in one implementation, the HMD device 20 has a plurality of components configured to perform the functions described herein. It should be understood that the illustrated HMD device 20 is but one example of a suitable HMD device, and that other types and styles of HMD devices may be utilized in a similar manner as described herein. In this example, the HMD device 20 includes a headband 21, by which the HMD device 20 can be worn on a user's head. Attached to the headband 21 (directly or indirectly) is a transparent protective visor 22 that encloses one or more transparent AR display devices 23, each of which can overlay holographic images on the user's view of his real-world environment, for one or both eyes (e.g., by projecting light into the user's eyes). The protective visor 22 also encloses various circuitry (not shown) and sensors.

The HMD device 20 further includes one or more microphones 25 to input speech from the user (e.g., for use in recognizing voice commands and providing audio effects); one or more audio speakers 26 to output sound to the user; one or more visible-spectrum tracking cameras 27 for use in capturing images of surrounding surfaces to allow tracking of the user's head position and orientation in real-world space and hand gesture recognition; one or more non-visible spectrum depth cameras 28, such as but not limited to an infrared (IR) camera or sensor, for use in determining distances to nearby surfaces (e.g., for use in surface reconstruction to model the user's environment); one or more non-visible spectrum (e.g., IR) illumination sources 29 for use with the non-visible spectrum depth camera(s) 28; and one or more visible spectrum video cameras 30 for use in capturing standard video of what the user sees. The HMD device 20 also includes circuitry (not shown), which may be contained within the visor 22, to control at least some of the aforementioned elements and perform associated data processing functions (e.g., speech and gesture recognition and display generation). The circuitry may include, for example, one or more processors and one or more memories. Note that in other embodiments the aforementioned components may be located in different locations on the HMD device 20. Additionally, some embodiments may omit some of the aforementioned components and/or may include additional components not mentioned above.

Further, the HMD device 20 may include an inertial measurement unit 31 configured to measure one or more of the force, angular rate, and/or magnetic field of the HMD device 20. The inertial measurement unit 31 may include accelerometers, gyroscopes, and/or magnetometers. The measurements from the inertial measurement unit 31 may be used to determine an orientation and/or position of the HMD device 20 in the environment, which may be used to thereby determine the relative position in the environment of a point or surface of the real-world structure 106 identified by the measurement tool 100.

Additionally, the HMD device 20 and/or computer device 12 may utilize the information from the inertial measurement unit 31, the one or more visible-spectrum tracking cameras 27, and the one or more non-visible spectrum depth cameras 28 to construct a 3D model of the environment viewed by the HMD device 20. The 3D model may have a coordinate system that corresponds to a real-world coordinate system, and thus point and/or surfaces identified by operation of the HMD device 20 and the measurement tool 100 may be defined by coordinates in the coordinate system of the 3D model and thereby used to generate the virtual schematic 114 of the real-world structure 106.

Figure 3:
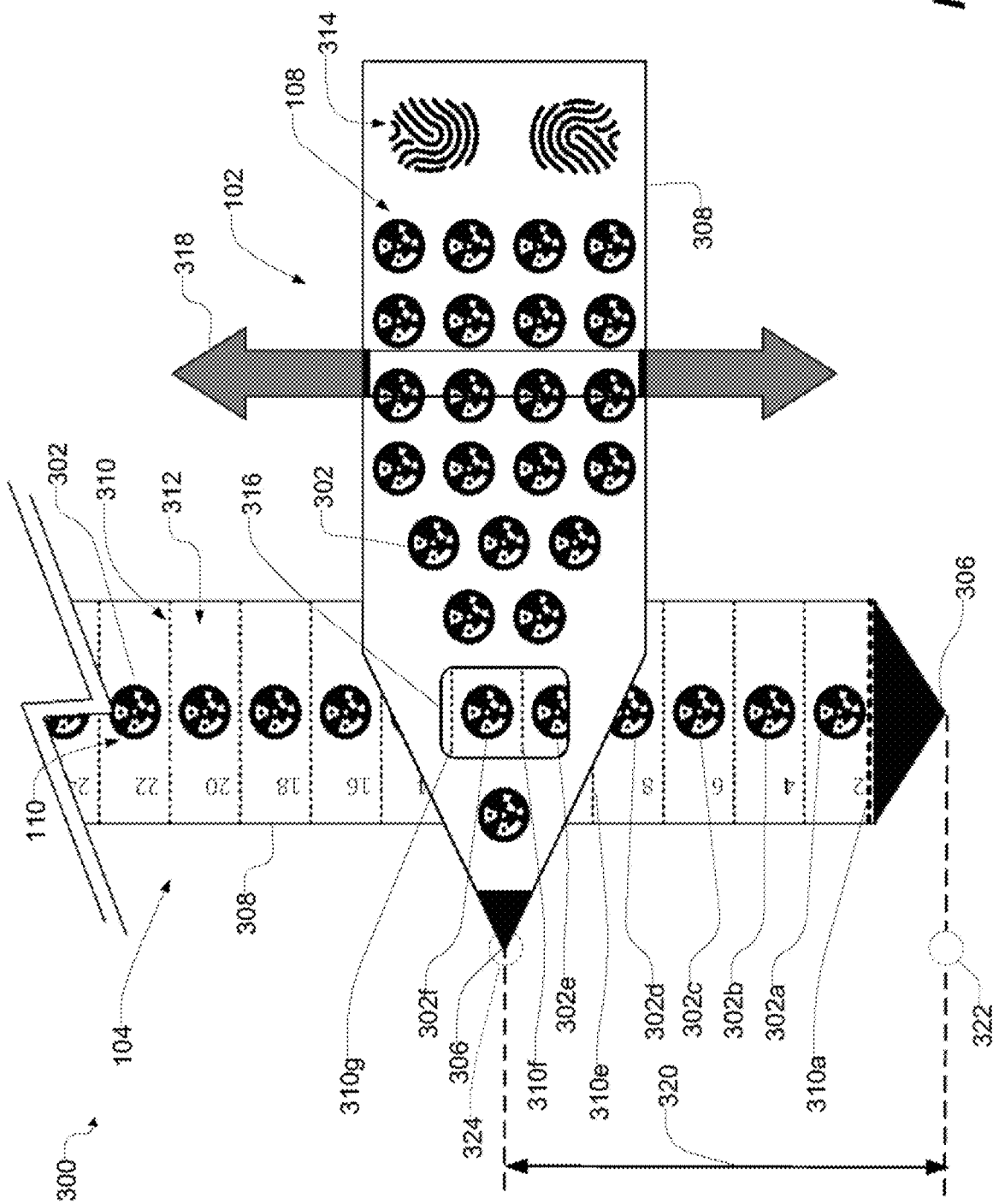
FIG. 3 is a top view of an example measurement tool having relatively movable first and second tool members each having fiducial markers.
Figure 4:
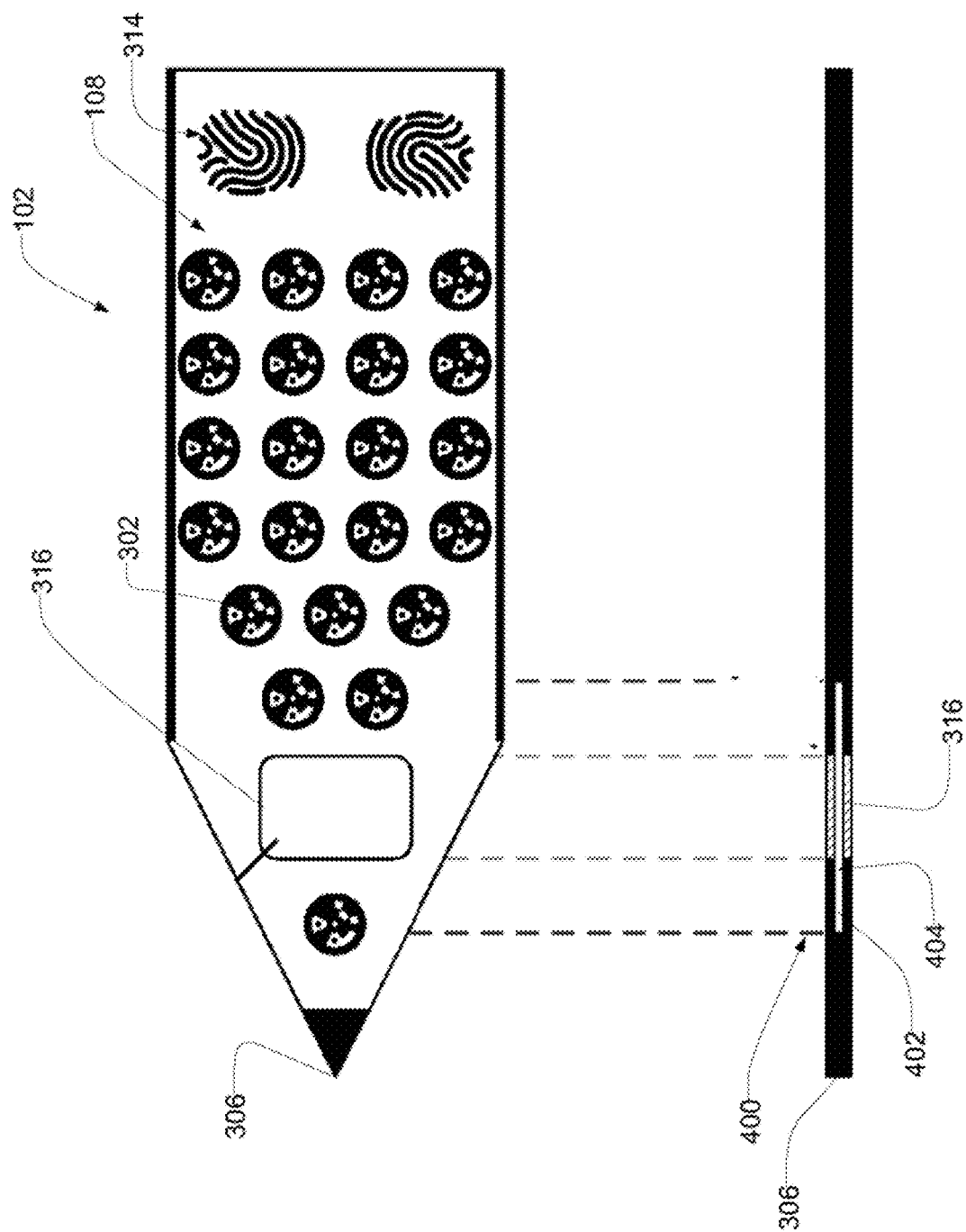
FIG. 4 is a combined top and side view, including a partial cross-section through the window, of the measurement tool of FIG. 3.
Figure 5:
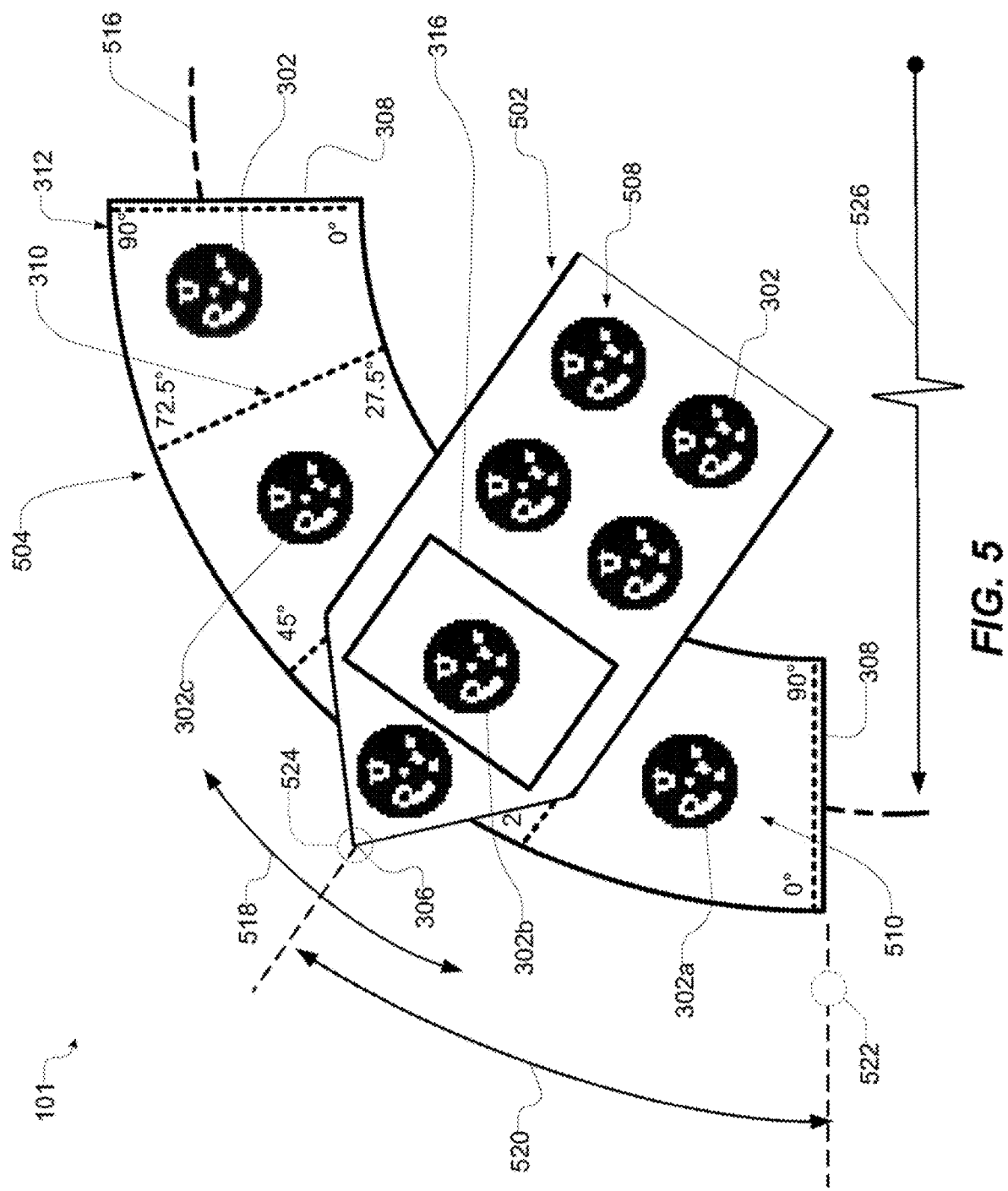
FIG. 5 is a top view of an example measurement tool.

Referring to FIGS. 3-5, examples of different measurement tools 100 and 101 that can be used by a user of the HMD device 20 to measure real-world structures may have different configurations, depending on a type of dimension to be measured. It should be understood that measurement tools 100 and 101 are two of a plurality of possible configurations and/or designs of a measurement tool that may incorporate the teachings of this disclosure. Further, although different, such tools may include one or more common features.

Notably, each measurement tool 100 and 101 includes first tool member 102 having the first set of fiducial markers 108 for determining a position used in a measurement, and relatively movable second tool member 104 having the second set of fiducial markers 110, one or more of which correspond to a known measurement value (e.g., a distance or angle) relative to a point or edge of the second tool member 104, for validating or modifying the position as determined using first tool member 102. Further, the second tool member 104 has, and/or the second set of fiducial markers 110 have, a known geometric relationship with the first tool member 102, and/or with the first set of fiducial markers 108, thereby enabling a relative positioning of the two members to identify a known measurement value. More specifically, for example, when the first and second tool members 102 and 104 are used to measure a dimension of a real-world object (e.g., object 106 in FIG. 1), the first set of fiducial markers 108 identify a position of a point 306 and/or edge 308 of first tool member 102 corresponding to a structure of the real-world object. As such, the HMD device 20 can assign a coordinate position or value (e.g., angle) to the point 306 and/or edge 308 in a coordinate system by identifying and determining the position(s) of one or more of the first set of fiducial markers 108 relative to a coordinate position of the HMD device 20. Further, the HMD device 20 can identify and determine the position(s) of one or more of the second set of fiducial markers 110 that are movably positioned relative to the first set of fiducial markers 108. Based on the known measurement value(s) associated with the identified one or more of the second set of fiducial markers 110 and the known geometric relationship between the members and/or set of markers, the coordinate position or value (e.g., angle) assigned to the point 306 and/or edge 308 of first tool member 102 corresponding to the structure of the real-world object can be validated or revised to improve an accuracy in the calculations or measurements performed by the HMD device 20.

Further common features may include, for example, each measurement tool 100 or 101 having a number of fiducial markers 302. Each of the fiducial markers 302 may be unique such that the HMD device 20 is able to identify an orientation and/or a position of the respective first or second tool member 102 and 104 of the respective measurement tool 100 or 101 from recognition of relatively few (e.g., 5) or even a single one of the fiducial markers 302. A size specification of each measurement tool 100 and 101 is included in the memory of the HMD device 20. The known size specifications enable precise identification of a given position, location, or surface by recognition of one, some, or all of the fiducial markers 302 on the respective measurement tool 100 and 101. Further, in some cases (not illustrated), each measurement tool 100 and 101 may optionally include a handle for additional ease of positioning by a user. Suitable examples of fiducial markers 302 may include, but are not limited to, any type of graphic or visually-recognizable mark, such as but not limited to an April tag, QR code, alphanumeric character, or any other marker that can be recognized by the HMD device 20.

Additionally, each measurement tool 100 and 101 may include a corner or point 306. The point 306 is used to identify particular position or location to generate a particular vertex in the digital space. When the point 306 is placed on a real-world location, the HMD device 20 includes programming to generate a digital vertex (e.g., a vertex of a holographic image) at that location. The measurement tools 100 and 101 may further include various edges 308. Each edge 308 can be used to identify a particular plane or line. When a user positions the edge 308 against a real-world surface, the HMD device 20 is programmed to generate a digital plane or line of a holographic image relative to the position of the measurement tool 100 and/or 101. The parameters of the plane or line may be determined based on HMD device 20 performing depth finding operations that identify the real-world first deviation/variation from the line or plane as the bounds of the indicated line or plane.

In some embodiments, one or more points 306 and one or more edges 308 are used in conjunction, where the point 306 indicates one bound of the line or plane. In some embodiments, rather than using the edge 308, the orientation of the surface including the fiducial markers 302 is used to determine the plane of surfaces defined by vertices indicated by points 306. A determination of an orientation of the measurement tool 100 and/or 101 may be aided by positional data of the HMD device 20. The HMD device 20 includes sensors, such as the inertial measurement unit 31, in order to be "gravity-aware" and to determine the down direction. Data indicative of the down direction may further enable the HMD device 20 to determine the orientation of the measurement tool 100 and/or 101.

Additionally, at least one of the measurement tools 100 and 101 may include one or more equally spaced marker lines 310, such as respective lines, to indicate changes in a value of the measurement relative to one or more points 306 and/or edges 308 of a respective tool member. In some cases, for example, the marker lines 310 may be different sized marker lines, where the size varies depending on the change in measurement value. For example, such marker lines 310 may include, but are not limited to, indicators such as a relatively long line (e.g., all the way across the tool) every inch (or every 10 degrees in an angular measurement tool), and additional lines of relatively decreasing lengths corresponding to, for instance, every half inch (or 5 degrees), quarter inch (or 2.5 degrees), and/or eighth of an inch (or every degree), etc. Additionally, each mark 310 may have a known geometric relationship with one or more fiducial markers 302, which may in turn also have a known geometric relationship with one or more points 306 and/or edges 308 of a respective tool member. As such, by identifying a position of a respective fiducial marker 302, a position of a corresponding mark 310 may be deduced.

Further, in some cases, at least one of the measurement tools 100 and 101 may include one or more rule graphics 312 corresponding to each of the marker lines 310. For example, the rule graphics 312 may be a user-readable character that enables the user to visually verify a value of a measurement. For example, the rule graphics 312 on the second tool member 104 may be characters that indicate a distance or angle relative to one or more edges 308 of the respective tool member.

Also, in some cases, at least one of the measurement tools 100 and 101 may include one or more handling graphics 314 (see FIG. 3) that identify one or more areas where a user may hold the respective tool member without interfering with an ability of the HMD device 20 to detect and identify the fiducial markers 302.

Referring more specifically to FIGS. 4 and 5, the example measurement tool 100 includes the first and second tool members 102 and 104 each having a number of fiducial markers 302. For instance, the first tool member 102 includes the first set of fiducial markers 108, each of which may be unique, which the HMD device 20 may be able to identify and use to determine an orientation of the first tool member 102 and/or a position or location of point 306 (or edge 308) on the first tool member 102. In some cases, a number of fiducial markers in the first set of fiducial markers 108 may be more than a sufficient number to enable the HMD device 20 to perform the identification(s), thereby enabling such identification(s) based recognition of a subset, e.g., relatively few (e.g., 4), of the fiducial markers in case one or more of the first set of fiducial markers 108 are blocked from view or not recognized.

Further, for instance, the second tool member 104 includes the second set of fiducial markers 110, each of which may be unique and may indicate a measurement value, such as a distance from point 306 (or edge 308) on the second tool member 104. For example, the fiducial marker 302a-302f may indicate distances of 2, 4, 6, 8, and 10 centimeters from point 306 (e.g., at the bottom of second tool member 104 in the illustrated orientation). In this example, the second tool member 104 may move along a transverse axis 318 relative to a longitudinal axis of the first tool member 102.

Additionally, at least one of the first and second tool member 102 and 104 may include a geometric reference 316 to enable the HMD device 20 to identify a current one of the plurality of relatively variable positions of the first and second tool members 102 and 104 based on identifying a position of the geometric reference. For example, the geometric reference 316 may be used to validate or revise a position or measurement measured based on the first tool member 102 (e.g., validate or revise a stair height based on a height calculated based on two vertex points identified by the first tool member 102) and/or to independently identify a measurement distance or angle of the position measured based on the first tool member 102 to another structure (e.g., a height or depth or angle of a stair relative to the point 306 of the first tool member 102). For example, the geometric reference 316 may include, but is not limited to, a window defined by internal walls within the body of the first tool member 102 that is sized for displaying one or more of the second set of fiducial markers 110 of the second tool member 104 relative to the point 306 (or, optionally, the edge 308) of the first tool member 102 when the second tool member 104 is placed underneath or within the body of the first tool member 102. The geometric reference 316 may include any other structure (e.g., an edge) or marking identifiable by the HMD device 20 that enables identifying the relative positioning of the first and second tool members 102 and 104. In the illustrated example, for instance, the window 316 may display fiducial markers 302e and 302f, as well as the adjacent marker lines 310f and 310g (discussed below). In this example, the fiducial markers 302e and 302f may indicate measurement values between the end point 306 of the second tool member 104 and either the fiducial markers themselves and/or the adjacent marker lines 310f and 310g within the window 316. For example, in some implementations, the fiducial marker 302e may indicate a measurement value, and/or a measurement band between the marker lines 310e and 310f, which in this example is between 10 and 12 centimeters away from the end point 306; similarly, the fiducial marker 302f may indicate a measurement band between the marker lines 310f and 310g, which is between 12 and 14 centimeters away from the end point 306.

Additionally, referring more specifically to FIG. 4, in some implementations, one or both of the first tool member 102 and the second tool member 104 may include a connector 400 configured to restrain the relative movement between the first tool member 102 and the second tool member 104 to a known relative movement. As such, the connector 400 thereby defines a relative geometric relationship between the first and second tool members 102 and 104 in each of a plurality of relative positions. For instance, in this example, the connector 400 may include one or more internal walls 402 in the first tool element 102 that define an internal slot 404 that extends transversely through the entire body of the first tool element 102. The slot 404 is sized to movably receive the body of the second tool element 104, e.g., the cross-sectional dimensions of the slot 404 are slightly larger than the corresponding cross-sectional dimensions of the body of the second tool member 104 to allow the second tool member 104 to be slidingly connected to the first tool member 102. For instance, in this example, the slot 404 allows sliding movement along transverse axis 318, which in this case corresponds to the longitudinal axis of the second tool member 104. It should be understood that the slot 404 is example of the connector 400, and that transverse sliding motion and linear movement are but one example of a type of relative movement that may be defined by the connector 400. Other examples of the connector 400 may include, but are not limited to, a pin, a rivet, a hinge, a screw and nut, etc., while other examples of relative movement may include, but are not limited to, angular motion or rotation.

Further, in this example, the geometric reference 316 in the form of the window may be a cutout in the body of the first tool member 102 that allows a surface of the second tool member 104 to be viewed by the HMD device 20 when the second tool member 104 is placed underneath or through the body of the first tool member 102. Optionally, the geometric reference 316 in the form of the window may further include a relatively transparent material, such as but not limited to a clear plastic or a glass, that is mounted to the body of the first tool member 102 to cover the area of the window.

In one example use, for instance, the measurement tool 100 may be placed relative to real-world object 106 (FIG. 1) to measure a linear distance 320 defined between point 322 and point 324. In this case, a position of point 322 may be previously determined by the measurement tool 100, and the position of the point 324 corresponds to a position identified by the end 306 of the first tool member 102 and confirmed or modified by the relative position of the second tool member 104, as is described below in more detail.

Referring more specifically to FIG. 5, the measurement tool 101 may be essentially similar to the example of the measurement tool 100 in FIGS. 3 and 4, but configured to measure angular as opposed to linear dimensions. In an implementation, measurement tool 101 includes a first tool member 502 having a first set of fiducial markers 508 and relatively positionable second tool member 504 having a second set of fiducial markers 510. The first and second set of fiducial markers 508 and 510 may include a number of fiducial markers 302, and may have similar characteristics as the first and second set of fiducial markers 108 and 110 respectively of the first and second tool members 102 and 104 of measurement tool 100. In this case, however, the second set of fiducial markers 110 may indicate an angular measure, such as a degree, or an angular measure relative to an angular mark 310. The first tool member 502 includes the geometric reference 316 in the form of the window for displaying the fiducial marker 302b for identification by the HMD device 20. For instance, in the illustration, the geometric reference 316 in the form of the window displays fiducial marker 302b, which is in between fiducial markers 302a and 302c, and which defines an angular measurement relative to at least one of the ends 308 of the second tool member 504 and/or relative to marker lines 310, and/or that defines an angular measurement band (e.g., between 27.5 degrees and 45 degrees in the illustration).

Also, in this case, the first tool member 502 may include internal walls defining a slot (not shown) that allows the second tool member 504 to move in direction 518 curvedly along an arc 516 with respect to the first tool member 502. For example, the arc 516 may correspond a radius of curvature 526, and the second tool member 504 may be formed with the radius of curvature 526 having any one of a plurality of values depending on, for instance, a distance between structures whose coordinates are being used to determine an angle.

In one example use, for instance, the measurement tool 101 may be placed relative to real-world object 106 (FIG. 1) to measure an angular distance 520 defined between point 522 and point 524. In this case, a position of point 522 may be previously determined by the measurement tool 101, and the position of the point 524 corresponds to a position identified by the end 306 of the first tool member 502 and confirmed or modified by the relative position of the second tool member 504, in a same or similar manner as is described below in more detail.

In some implementations, the size specifications of each measurement tool 100 and/or 101 and the respective first and second tool members 108, 110 and 508, 510 may be stored in the memory 122 of the HMD device 20. The known size specifications enable precise identification of a given position/location or surface by recognition of one, some or all of the number of fiducial markers 302 on one or both of the first tool member 102, 502 and the second tool member 104, 504.

Figure 6:
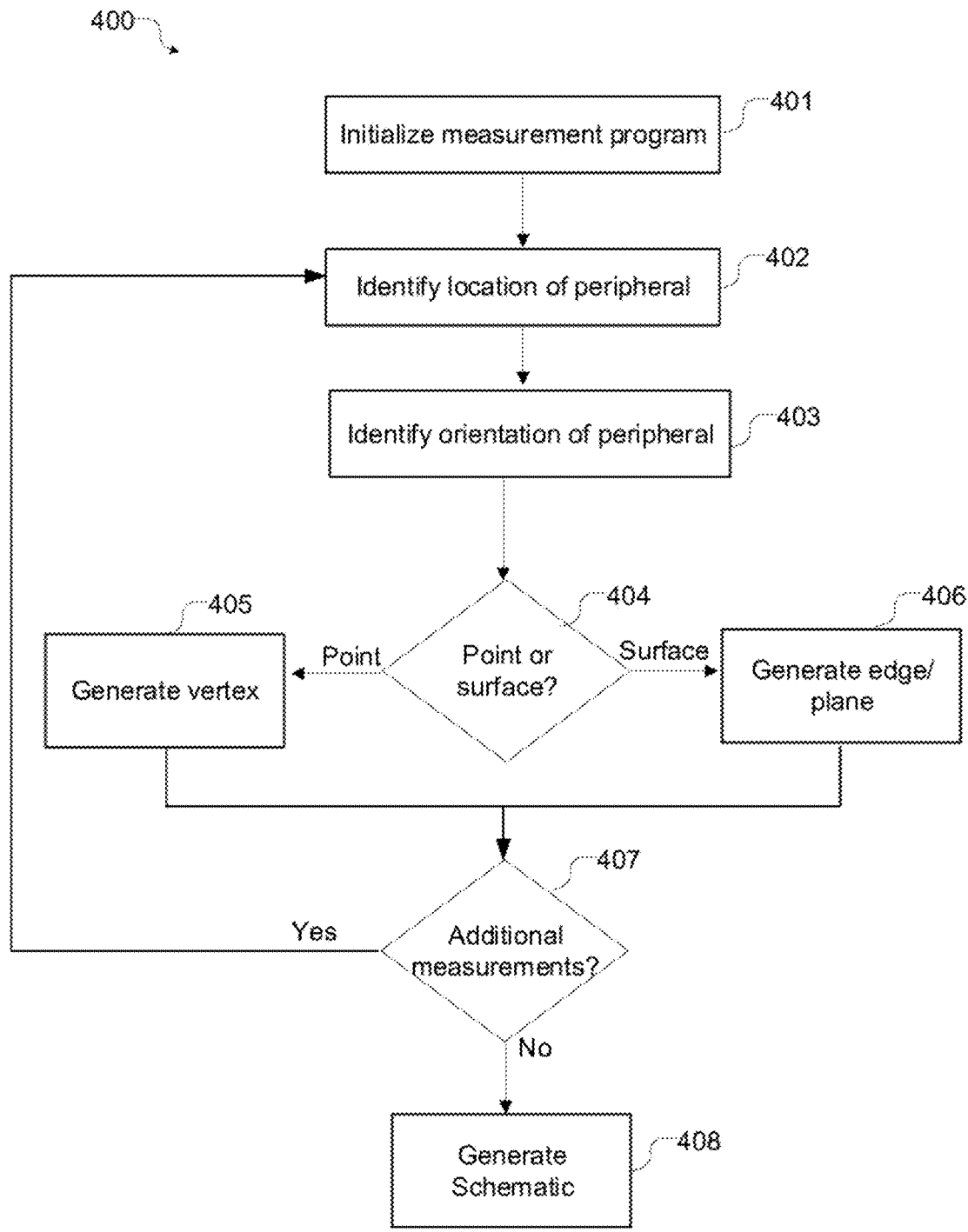
FIG. 6 is a flowchart of an example method of the operation of a measurement tool in combination with an HMD device.

Referring to FIG. 6, an example operation of measurement tool 100, 101 in combination with the HMD device 20 is described for an example of a method 400 of measuring dimensions of real-world object 106 and generating virtual schematic 114 including one or more final dimensions 112 based on the measurements. In action 401, the HMD device 20 initializes a measurement program, which may be stored in the memory 122. In this step, the HMD device 20 checks orientation and scans local real-world surfaces. In action 402, the HMD device 20 identifies a location of measurement tool 100 or 101. The HMD device 20 uses recognition of fiducial markers 302 to find the measurement tool 100 or 101 in the field of view of the HMD device 20.

In action 403, the HMD device 20 identifies the orientation of the measurement tool 100 or 101. This is performed, for example, by identifying the comparative distance of each of the recognized fiducial markers 302. In action 404, the HMD device 20 determines based on the orientation of the measurement tool 100 or 101 how to handle the user input of the measurement tool 100 or 101 location/positioning. The HMD device 20 determines whether the user input is requesting a point or an edge/surface. For example, the HMD device 20 interprets the orientation of the measurement tool 100 or 101, and, when only a point or corner of a peripheral tool contacts a surface, the HMD device 20 handles the input as requesting a point/vertex. Further, for example, in some cases when an edge of the measurement tool 100 or 101 contacts a surface, the HMD device 20 handles the input as requesting a line or edge. Also, for example, when the measurement tool 100 or 101 is laid flat on a surface, the HMD device 20 interprets the input as requesting a plane. Alternatively, for example, the user may identify the type of user input based on a gesture, and/or based on selecting an input type from a virtual menu. Where the user input indicates a point, in action 405, the HMD device 20 generates a vertex in digital space, which may be a coordinate system generated by the HMD device 20 that corresponds to a real-world coordinate space. Where the user input indicates a plane or a line, in action 406, the HMD device 20 generates a digital plane oriented with the measurement tool 100 or 101, or a line parallel with the edge 308 of the measurement tool 100 or 101.

In action 407, the HMD device 20 determines whether or not there are additional measurements to capture based on user input (e.g., voice command, button press, gesture, hiding the peripheral tool, or other known user input known in the art). In some cases, the additional measurements include capturing the relative position of one or more fiducial markers 302 of the second tool member 104 or 504 relative to the geometric reference 316 of the first tool member 102 or 502, as will be described in more detail below. In other cases, the additional measurements may include points, lines, or planes associated with a dimension of the real-world structure 106. Where there are additional inputs to measure additional points, lines, or planes, the method returns to action 402. In action 408, where there are no additional surfaces or vertices, the HMD device 20 generates a holographic schematic 114 of the real-world structure 106 as indicated/outlined by the measurement tool 100 or 101 based on validating or modifying one or more coordinates of one or more final dimensions 112 based on the fiducial markers 302 of the second tool member 104 or 504, as is explained below in more detail.

Figure 7:
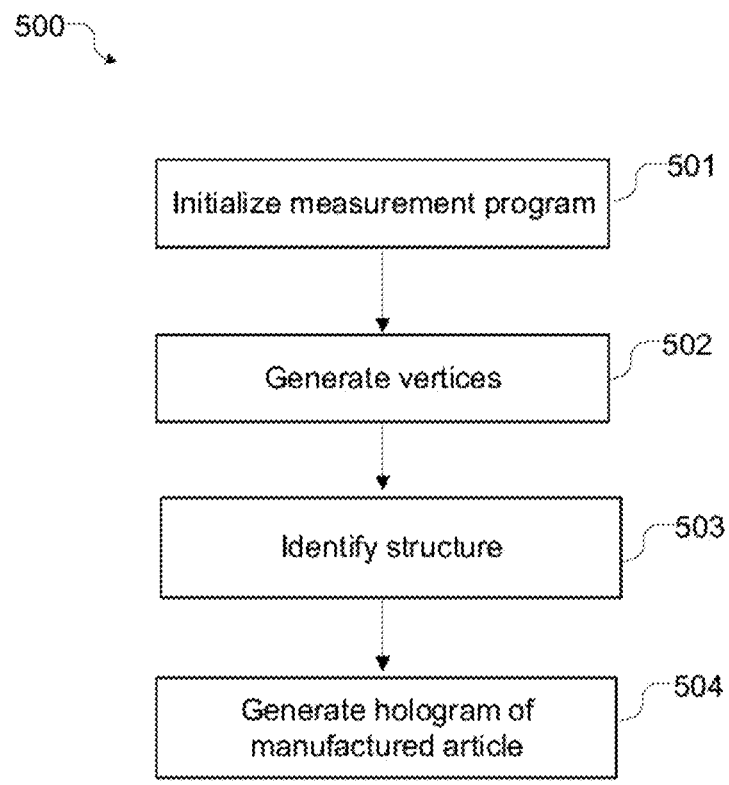
FIG. 7 is a flowchart of an example method of the holographic generation of a manufactured device fitting a digital schematic.

Referring to FIG. 7, one example additional operation of the HMD device 20 and/or computer device 12 includes an example of a method 500 of generation of a holographic image of a manufactured (or to be manufactured) device corresponding to, and/or based on, the digital schematic diagram ("schematic") 114. In action 501, the HMD device 20 initializes a measurement program, which may be stored in the memory 122. In this action, the HMD device 20 may check orientation and scan local real-world surfaces. This step proceeds similarly as step 401 in FIG. 6. In step 502, the HMD device 20 generates a series of vertices for a holographic structure that matches the real-world structure 106. Each of the vertices is identified via user input.

In action 503, the HMD device 20 identifies the holographic structure. This identification may be based on user input or based on automatic image recognitions algorithms. The recognition algorithms can use machine learning to compare shapes to expected models or parameters. Once the HMD device 20 determines a type of structure through recognition algorithms, the user is enabled to reclassify the structure type via user input. In action 504, based on the determination of the character of the holographic structure the HMD device 20 generates a holographic manufactured article to fit the holographic structure positioned digitally relative to the holographic structure. Examples of manufactured articles that can be positioned according to holographic structures include blinds in window frames, a treehouse in a tree, shelves/cabinets on a wall, a light fixture in a room, and a motorized chair in a stairwell.

Figure 8:
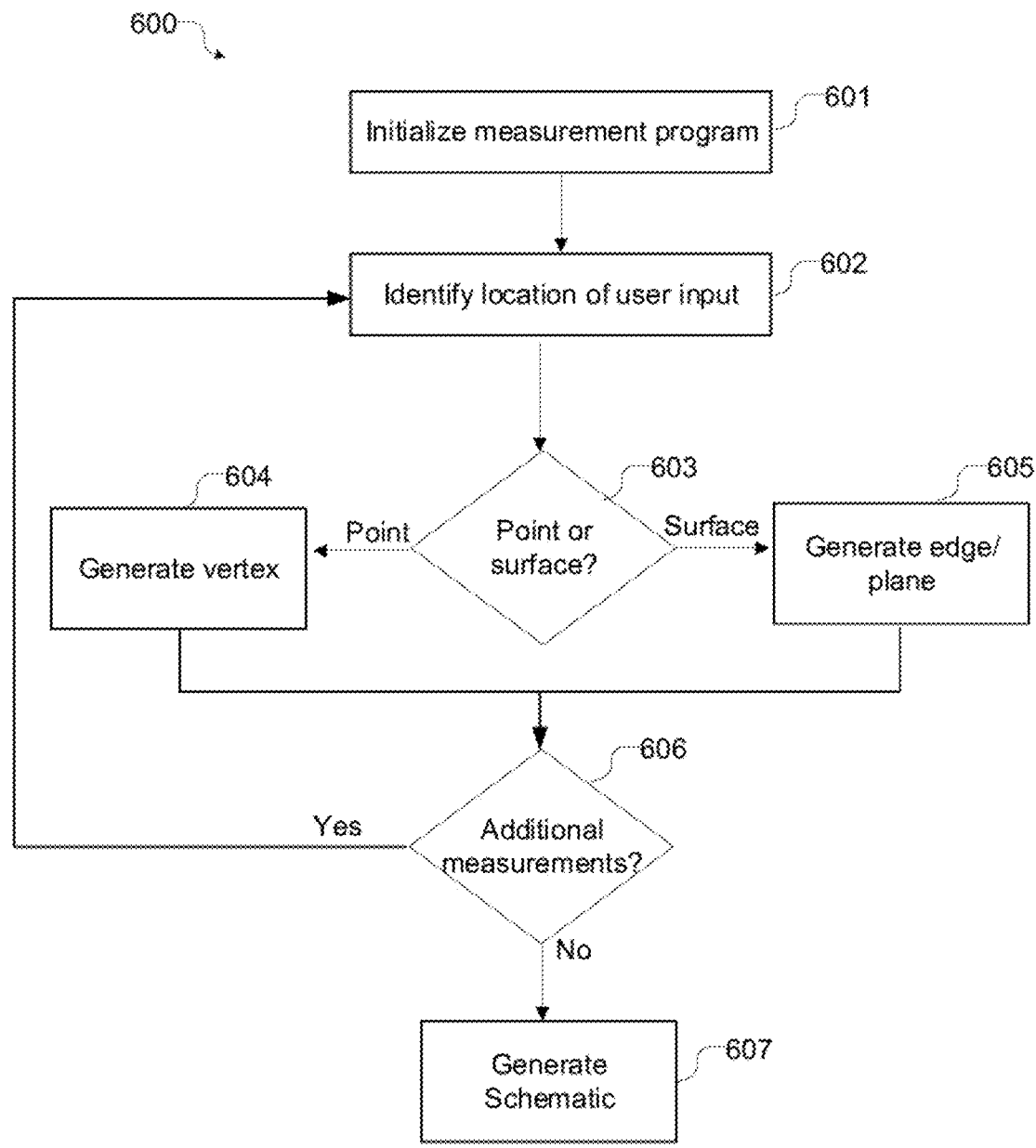
FIG. 8 is a flowchart of an example method of operation of an HMD device handling user input without a peripheral to measure real-world structures.

Referring to FIG. 8, an example operation of an HMD device 20 includes an example of a method 600 for handling user input without a measurement tool 100 or 101 to measure real-world structures, which may be used to initially generate a rough, initial version of the schematic 114 where various points are subsequently verified as described above, and/or for generating an image frame associated with the process for generating the virtual schematic 114. The method 600 of FIG. 8 flows similarly to that of FIG. 6, however, action 602 merely includes user input as opposed to the use of a measurement tool 100 or 101. An example of suitable user input is pointing with a user's hand. Positioning of hands can substitute as peripheral tool orientation data. In some embodiments, voice commands supplement hand gestures to determine the manner in which the HMD device 20 generates the holographic schematic 114 (action 607). Examples of hand position input are the user tracing a location with their finger, and laying their hand flat on a surface and positioning a fingertip at a location.

In some embodiments, a user may merely identify a general vicinity, and the HMD device 20, using depth finding, generates a schematic of all real-world structures located within the general vicinity. While the HMD device 20 is operational, it can use its depth camera(s) and associated processor(s) to construct a 3D mesh model of all surfaces in the user's vicinity (e.g., within several meters), or at least of all nearby surfaces within the user's field of view, including their distances from the user (i.e., from the HMD device 20).

As mentioned above, in at least one such an embodiment, the user input is merely providing the HMD device 20 with an image frame that includes the desired real-world structure. In some cases, the real-world structure covers more than a single image frame. In such cases, the user pans the HMD device 20 or moves, thereby generating a number of consecutive image frames. For example, a user capturing a staircase may indicate a beginning frame to the HMD device 20, and then proceed to walk up the staircase while focusing on the stairs. While the user moves, the HMD device 20 captures a schematic of the staircase.

Figure 9:
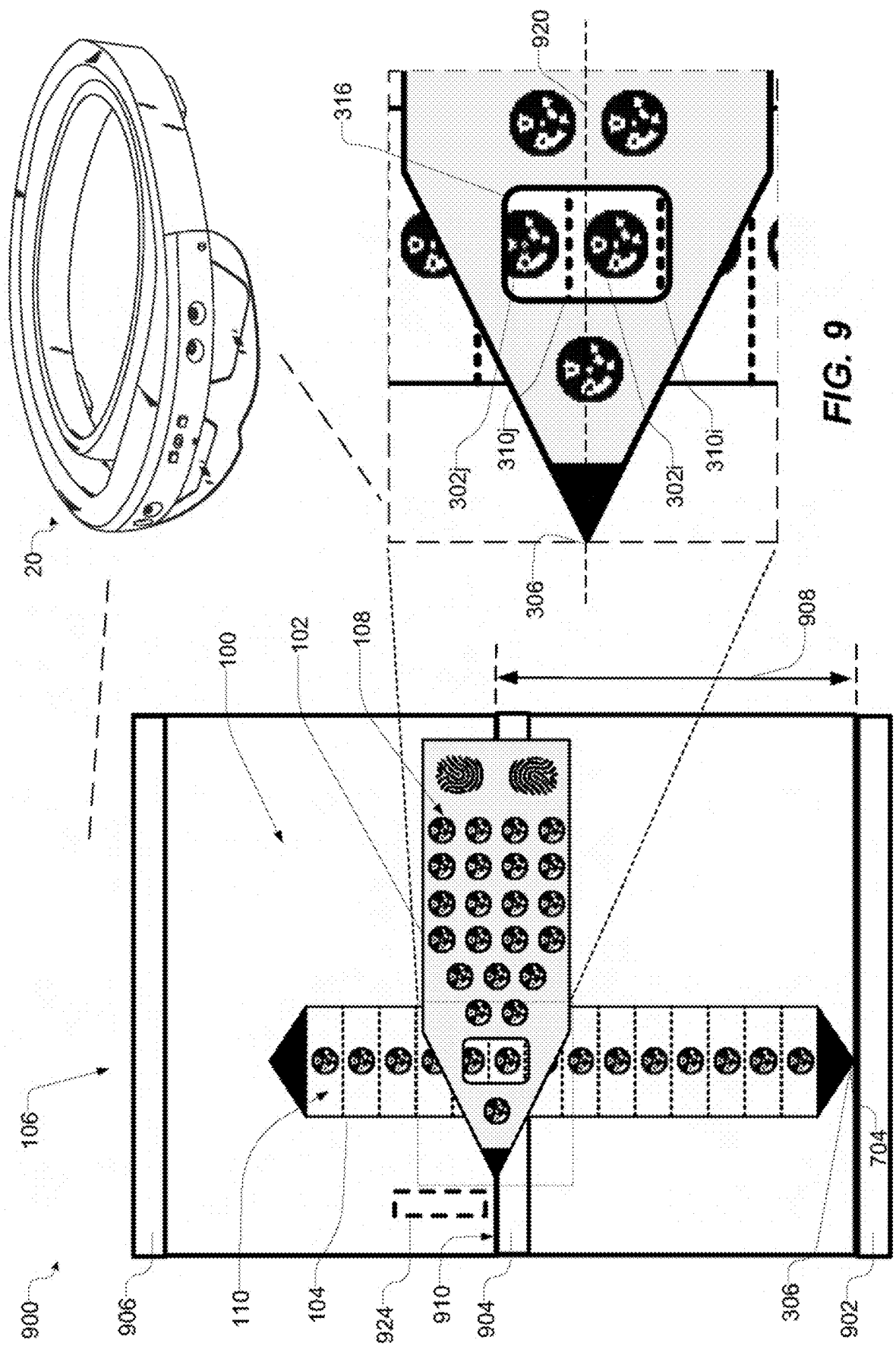
FIG. 9 is schematic diagram of an example of operating the HMD device and the measurement tool to measure one or more dimensions of a real-world structure, such as stairs in this case.

Referring to FIG. 9, during operation in an environment 900, the user may want to directly measure, or validate or improve an accuracy of a dimension of real-world object 106, such as but not limited to a stairway having steps 902, 904, and 906, through the use of the second tool member 104 of the measurement tool 100. Specifically, the user may want to input into the HMD device 20, via one or more of the depth cameras 28 or the video cameras 30, a height 908 of the step 904 relative to the step 902. In an example, the user may place the first tool member 102 along the step 904, and align the tip or point 306 of the first tool member 102 with a top surface 910 of the step 904 to measure the height 908 of the step 806. Specifically, the coordinates of the vertex identified by the point 306 of the first tool member 102, as determined based on identification of one or more of the first set of fiducial markers 108, may be used to calculate the height 908, e.g., relative to a corresponding point on the top of the step 902 and/or relative to a line or plane corresponding to the top of the step 902. Further, the HMD device 20 may validate and/or modify the measurement of the height 908 based on the coordinates of the vertex corresponding to the point 306 of the first tool member 102 based on identifying a position of one or more of the second set of fiducial markers 110 of the second tool member 104. For example, the HMD device 20 may detect the geometric reference 316 and one or more of the second set of fiducial markers 110 in order to identify a measurement value that corresponds to the height 908. For instance, in this case, the geometric reference 316 includes a window in the first tool member 102 through which the HMD device 20 may detect and identify one or both of the fiducial marker 302i and 302j, one or both of which may be correlated to marker lines 310i and 310j. For example, the fiducial marker 302i may indicate a respective measurement value, e.g., 19 cm, of its center point from the point 306 of the second tool member 104, and/or that the marker line 310i is 18 centimeters away from the point 306 of the second tool member 104. Similarly, the fiducial marker 302j may indicate a respective measurement value, e.g., 21 cm, of its center point from the point 306 of the second tool member 104, and/or that the marker line 310j is 20 centimeters away from the point 306 of the second tool member 104. Since at least parts of both fiducial markers 302j and 302j appear in the window, the height 908 (aligned to the tip or point 306 of the first tool member 102) of the step 904 is between 18 and 20 centimeters.

Additionally, in some implementations, the HMD device 20 may communicate with an inclinometer 924 that may be placed against a surface of the real-world object 106, and/or that may be placed against a surface of the first or second tool member 102 or 104, to measure an angle of the surface or of the measurement tool 100. For instance, as illustrated, the inclinometer 924 may be placed on the top surface 910 of the step 904 to measure an angle of the surface. The inclinometer 924 may communicate one or more measurements to the HMD device 20, such as via a wired or wireless connection. The HMD device 20 may utilize the inclinometer 924 in combination with its own measurements to determine orientations of surfaces. The inclinometer 924 may also be used to improve an accuracy of a measurement of distance, such as the height 908 (and, optionally, a depth or width). For example, the inclinometer 924 may be used to align the first tool member 104 substantially normal to the top surface 910. This ensures the accurate measurement of the height 908 and reduces the possibility of over-measuring the height 908.

Figure 10:
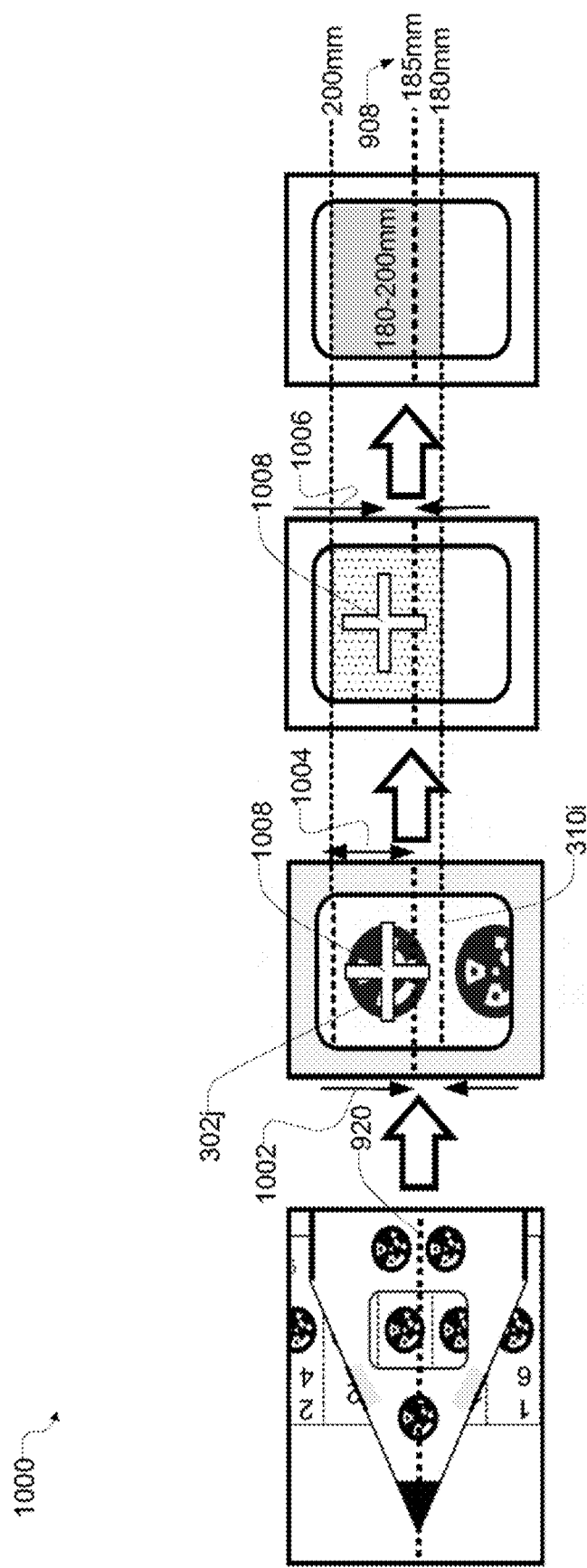
FIG. 10 is a sequence of images representing an example of a method of validating or modifying a measurement of a dimension of a real-world structure.

Referring additionally to FIG. 10, further, in some examples, the height 908 of the step 904 may be more specifically estimated and/or validated by the HMD device 20 using the following method. The HMD device 20 may determine an imaginary line 920 that extends from the tip or end 306 of the first tool member 102 through the middle of the window that forms the geometric reference 316, where the imaginary line 920 corresponds to the top surface 910 of the step 904. As such, the HMD device 20 can determine a distance 1002 and/or 1004 between the imaginary line 920 and one or both of the marker lines 310i and 310j, and/or the distance 1006 between center line of at least one of the fiducial markers, e.g., the centerline 1008 of fiducial marker 302j, and the imaginary line 920, and then add or subtract the respective distance from the known distance(s) (of the marker line(s) or fiducial marker position(s)) from the bottom end point 306 of the second tool member in order to calculate another value for height 908 to validate or modify the previously-determined value for height 908 as determined by the coordinates of the vertex of the point 306 of the first tool member 104 as determined by the HMD device 20. Alternatively, for example, the HMD device 20 may utilize other methods of estimation to determine a relative position of the imaginary line 920 within the measurement band defined by at least one fiducial marker 302. For example, in the illustrated configuration of FIG. 9, the imaginary line 920 is closer to the marker line 310j, which corresponds to 20 cm or 200 mm from the bottom point 306 of the second tool member 104, than to the marker line 310i, which corresponds to 18 cm or 180 mm from the bottom point 306 of the second tool member 104. In this case and in one or more (e.g., to confirm an estimation) of these manners, for example, the HMD device 20 may determine that the imaginary line 920 is 5 mm above the marker line 310i, and thus may calculate that the point 306 of the first tool member 102 may be approximately 18.5 centimeters away from the bottom point 306 of the second tool member 104, and therefore the height of the step 904 is 18.5 centimeters. Other measurement value units of measure and levels of precision may also be used to approximate the distance. Additionally, as mentioned, the HMD device 20 may use more than one measurement determination method, and utilize some function (e.g., averaging) or rule (e.g., throw out one or more measurements with largest and/or smallest deviation from the others), to determine the value for the height 908 based on the identified one or more of the second set of fiducial markers 110 of the second tool member 104.

Accordingly, the HMD device 20 may validate or update the height 908 of the step 904 using at least the measurement from the second tool member 104 relative to the first tool member 102 of the measurement tool 100. For example, the HMD device 20, using the depth cameras 28 or the video cameras 30, may capture an image of the steps 902 and 904 without the measurement tool 100 and determine that the height 908 of the step 904 is 19 cm. By utilizing the measurement tool 100 to measure the height 908 of the step 904, the HMD device 20 may capture an image of the window that defines the geometric reference 316 and determine one or more of the second set of fiducial markers 110 within the window, and correspondingly calculate that the point 306 of the first tool member 102 and hence the height 908 of the step 904 is 18.5 cm away from the bottom point 306 of the second tool member 104. Accordingly, the HMD device 20 may follow a final height determination procedure to calculate the final dimension of the height 908. The final height determination procedure may utilize the height determined based on the relative position of one or more of the second set of fiduciary markers 110 of the second tool member 104, using it to validate a previously-determined value, or to update a previously-determined value. For example, updating a previously-determined value may include replacing or modifying such value. The final height determination procedure may utilize any type of mathematical function to modify the value, such as by taking an average and or by applying weights to the different values and averaging, or any other type of functions. In one example, which should not be construed as limiting, the HMD device 20 may calculate a new height 908 based on a weighted average of the two height data (e.g. 19 cm and 18.5 cm). For example, with weights of 0.2 for the prior measurement value and 0.8 for the tool-based value, the HMD device 20 may determine the new height is (19×0.2)+(18.5×

0.8)=18.6 cm. Other weighted or unweighted calculations may also be used to calculate the new height.

In other examples, the first set of fiducial markers 108, 508 and the second set of fiducial markers 110, 510 may include alphanumeric characters. The HMD device 20 may utilize optical character recognition to identify the alphanumeric characters when identifying the first and second sets of fiducial markers 108, 508, 110, 510.

Figure 11:
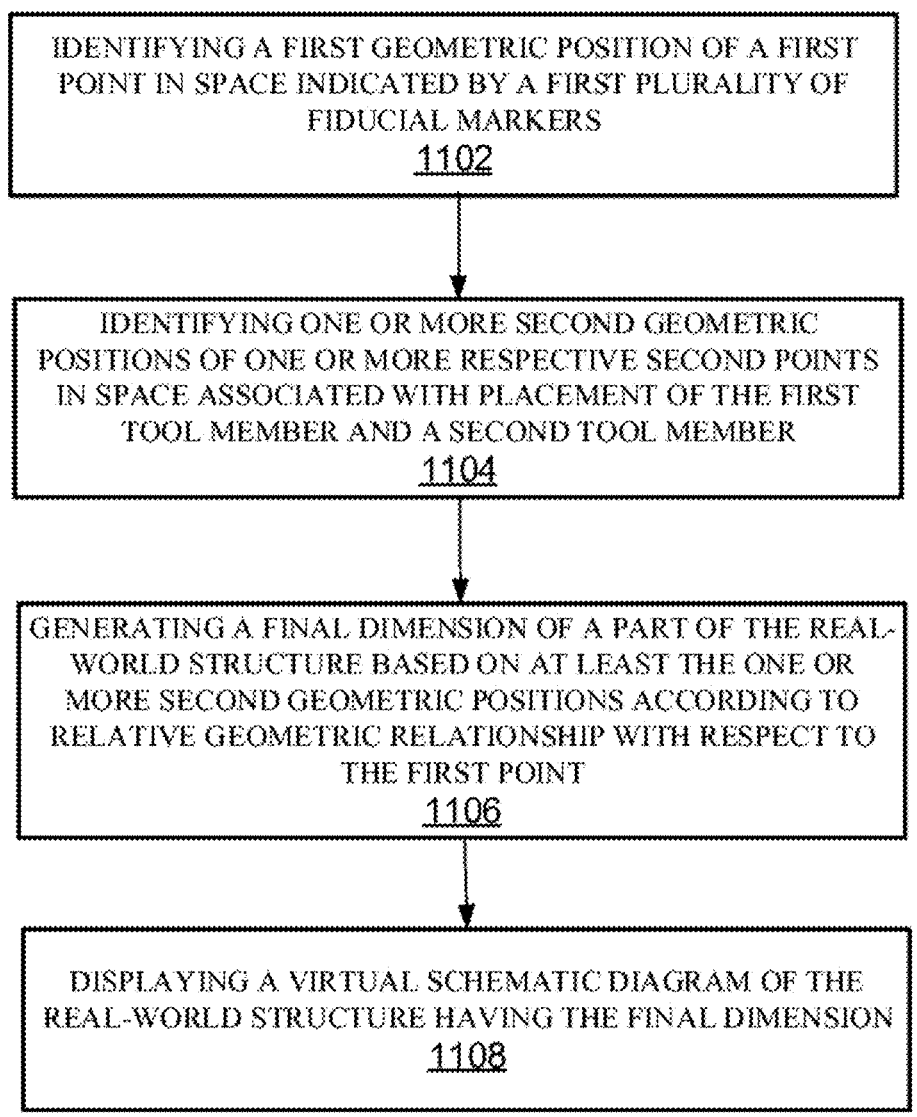
FIG. 11 is a flowchart of an example method of operation of the HMD device using the measurement tool having different sets of fiducial markers in an AR measurement and schematic-generation system.
Figure 12:
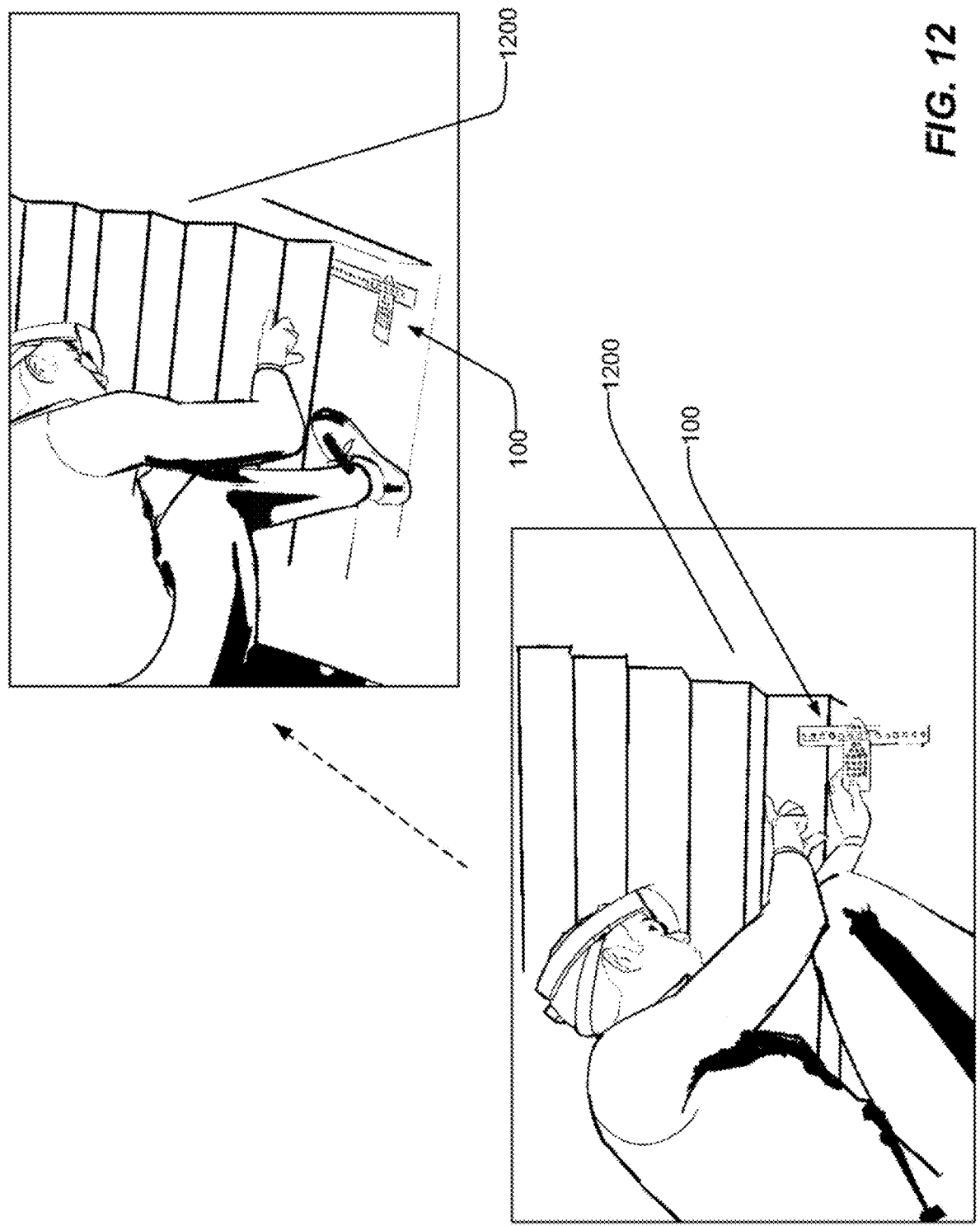
FIG. 12 is a schematic diagram of a user operating the HMD device and measurement tool to capture inputs from the measurement tool to define points or surfaces of a real-world structure, such as a stairway in this case.

Referring to FIGS. 11 and 12, an example method 1100 of improving measurement accuracy using fiducial markers includes use of the measurement tool 100 (e.g., FIGS. 1 and 2) or 101 (e.g., FIG. 5) including the first tool member 102, 502 having the first set of fiducial markers 108, 508 and the second tool member 104, 504 having the second set of fiducial markers 110, 510, for use in measuring one or more dimensions of a real-world structure 106, such as the stairway 1200 of FIG. 12. Besides FIG. 12, the method 1100 is further discussed with reference to the preceding figures, and in particular FIGS. 1, 9 and 10.

At action 1102, the method 1100 identifies a first geometric position of a first point in space indicated by a first plurality of fiducial markers. For example, the identification component 150 identifies the position of the point 306 of the first tool member 102 indicated by the first set of fiducial markers 108. The HMD device 20 may identify the orientation (e.g. vertical) of the measurement tool, and determine that the measurement taken relates to the height of the step 904 when the point 306 of the first tool member 102 is aligned to the top surface 910 of the step 904. In other cases, if the HMD device 20 identifies the orientation as horizontal, the measurement taken may be the width or length of the step 904. In some implementations, the identification component 150 may use a profile of the measurement tool 100 stored in the memory 122 and an identification of the first set of fiducial markers 108 to calculate the first geometric position, such as a position of the point 306 of the first tool member 102 of the measurement tool 100.

At action 1104, the method 1100 may identify one or more second geometric positions of one or more respective second points in space associated with placement of the first tool member and a second tool member. For example, the identification component 150 may identify the height 908 of step 904 when the first tool member 102 and the second tool member 104 are placed against the side of the step 904. When the point 306 of the first tool member 102 is aligned with the top surface 910 of the step 904, the identification component 150 may identify one or more of the second set of fiducial markers 110 of the second tool member 104, and its/their associated measurement (e.g. 20 cm), relative to geometric reference 316, e.g., within window. Further, the identification component 150 may identify the distance(s) between the imaginary line 920 and one or more of the marker lines 310, e.g., marker lines 310*i* and 310*j*, and/or the distance(s) between the imaginary line 920 and one or more of the second set of fiducial markers lines 110, e.g., fiducial marker 302*j*, and one or more of these distances may be used to determine and/or validate the height 908 of the step 904.

In other words, actions 1102 and 1104 result in calculating a current one of the plurality of relative positions between the first tool member and the second tool member based on a profile of a physical geometry of the measuring tool stored in a memory and based on the head-mounted display device identifying one or more of each of the first plurality of fiducial markers and the second plurality of fiducial markers.

At action 1106, the method 1100 generates a final dimension of a part of the real-world structure based on at least the one or more second geometric positions according to relative geometric relationship with respect to the first point. For example, the dimension component 152 may determine, validate, or update the height 908 of the step 904 using the measurement (i.e., 19.5 centimeters) from the measurement tool 100. For example, the HMD device 20 may determine the new height based on a final dimension determination procedure, which may use a mathematical function and/or rule to determine the final dimension 112, as described above.

At action 1108, the method 1100 may display a virtual schematic diagram of the real-world structure having the final dimension. For example, the display component 154 may display a virtual schematic diagram 114 of the real-world structure 106, such as a stairway having the step 904 with the height 980 of a value matching the final dimension 112. In certain implementations, the display component 154 may superimpose a virtual structure based on the virtual schematic diagram 114 over the real-world structure 106.

Figure 13:
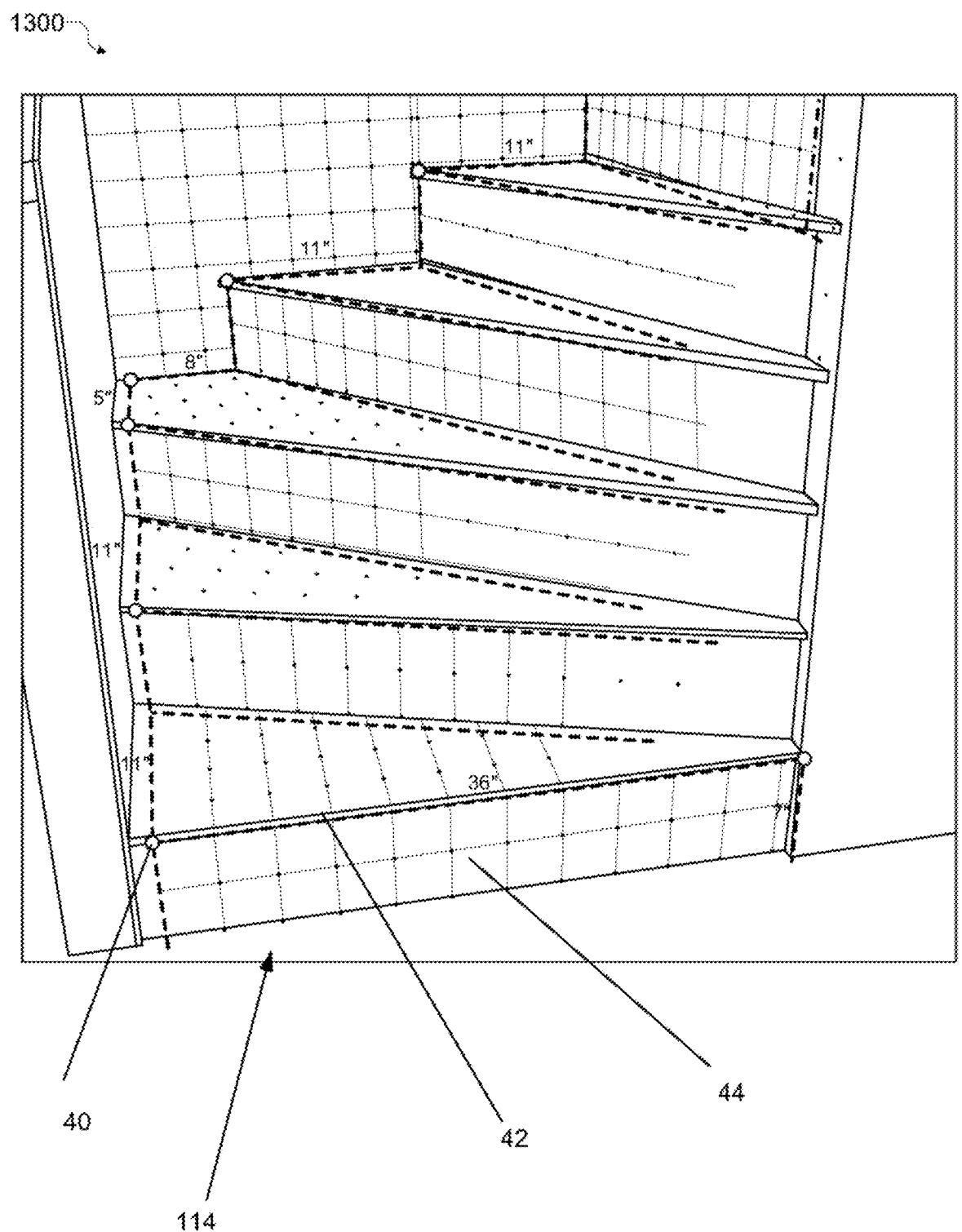
FIG. 13 is an image of an example holographic schematic overlaid on a real-world structure, such as a curved stairway in this case.

Referring to FIG. 13, an image 1300 represents at least a portion of a holographic schematic 114 is overlaid on the real-world structure 106. In this case, the real-world structure 106 is a staircase. Overlaid on top of the staircase is a holographic schematic 114 including a number of virtual vertices 40, virtual edges 42 connecting virtual vertices 40, and virtual surfaces 44 bounded by the virtual edges 42. Other examples of real-world structures that the HMD device 20 may generate holographic schematics of include a room, a natural structure such as a tree or a cave, a car, or other suitable physical structure that has visually ascertainable dimensions.

Figure 14:
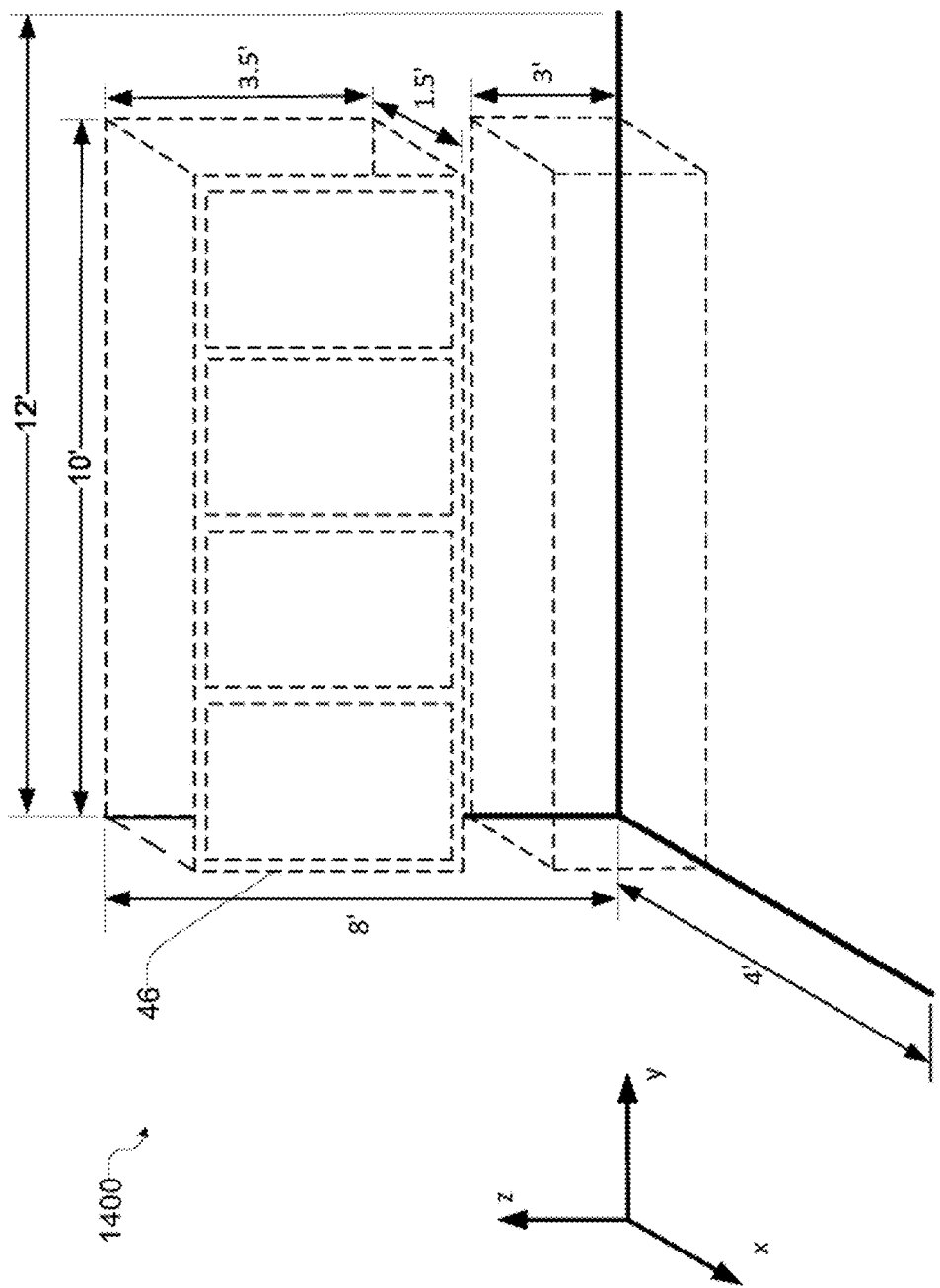
FIG. 14 is an image of an example holographic structure generated based on a holographic schematic.

Referring to FIG. 14, an image 1400 of a holographic structure 46 generated based on a holographic schematic. In this example, the holographic structure 46 is a set of cabinets positioned in the corner of a room. The HMD 20 device has generated a schematic of the room and has created a display of the virtual cabinets within that room. The HMD device 20 may generate the holographic structure 46 using specifications of corresponding real-world components. The HMD device 20 may also use a custom shape generated based on the particular character and shape of the holographic schematic 39. This enables a user to visualize the look of a manufactured article to install with the real-world structure.

In this example, the HMD device 20 has access to a virtual schematic of the corner of a room. The HMD device 20 or another source may have generated the schematic. The corner has twelve feet by four feet of floor space (this may not be the entire size of the room, but is the extent of the schematic). Further, the corner is eight feet tall. Thus, the HMD device 20 is able to determine that the corner will accommodate a ten feet by one and a half feet cabinet that is three and a half feet tall, and a counter having a similar footprint that is three feet tall. There is one and a half feet of remaining counter space. Thus, the HMD device 20 displays a holographic structure 46 (a cabinet) that matches this profile.

A number of real-world structures may be viewed with an HMD device in similar manner as described above, so as to appear to have holographic structures applied to them. For example, a real-world tree may include holographic insertion of a treehouse. A real-world car may include a holographic spoiler. A real-world house may include a holographic balcony.

Figure 15:
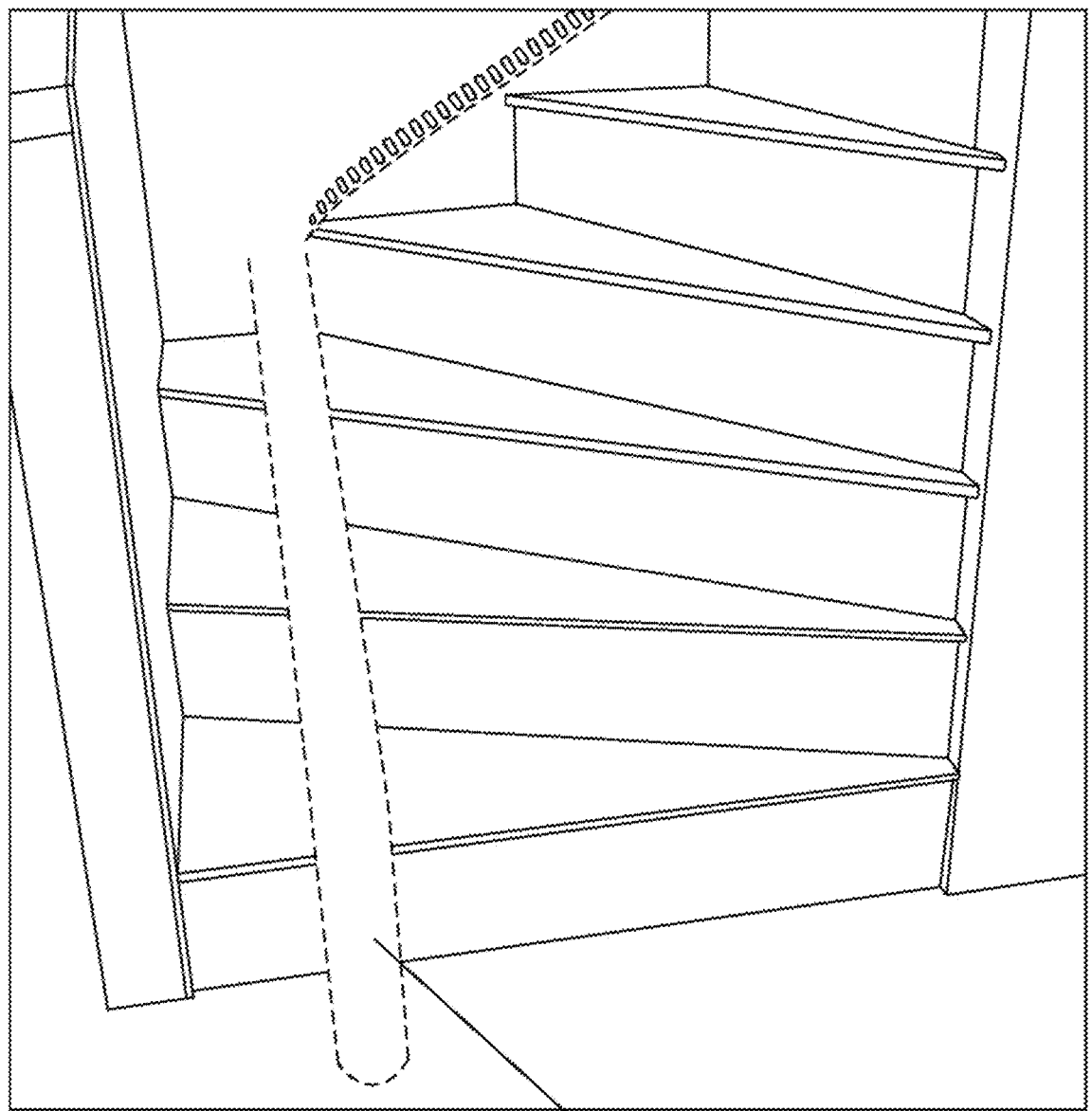
FIG. 15 is an image of an alternate example holographic structure generated based on a holographic schematic.

Referring to FIG. 15, an image 1500 of an alternate holographic structure 46 generated based on a holographic schematic includes a rail for an automated stairway chair. The holographic rail is displayed as applied to a real-world stairway. The holographic rail is generated by the HMD device 20 matching parameters of the captured schematic 114 described herein.

Referring to FIG. 16, an image 1600 of a holographic user interface for selecting style options on a holographic structure includes the holographic structure in a first style configuration. A holographic icon 48 includes user interface controls that enable a user to adjust the style or shape of the holographic structure 46 to preference. The figure displays a current holographic option 50 as chosen on the holographic user interface 48. In this case, the option is a series of vertical cabinets. In use, a user may tap a finger in the air near the location of the holographic user interface 48 to select alternate options within the user interface. Options include alternate styles, colors, materials appearance, and positioning of the holographic structure 46.

Referring to FIG. 17, an image 1700 of a holographic structure includes a second style configuration after receiving a selection in the holographic user interface. The figure displays a newly selected current holographic option 50 after the user engaged with the holographic icon 48 of FIG. 16. In this case, the option was of two vertical cabinets and two horizontal shelves.

By using the HMD device 20, and through the use of hand gestures, voice commands and/or controlled gaze, the user can create and manipulate various 3D holographic (AR) objects, such as spheres and cubes. For example, the user can create and delete holographic objects, move and rotate holographic structures 46, change colors, fill patterns, surface textures and decorations of holographic objects, etc. As shown, these objects are overlaid on the user's view of the real-world. Of course, many different variations of the above-described approaches are possible.

Figure 18:
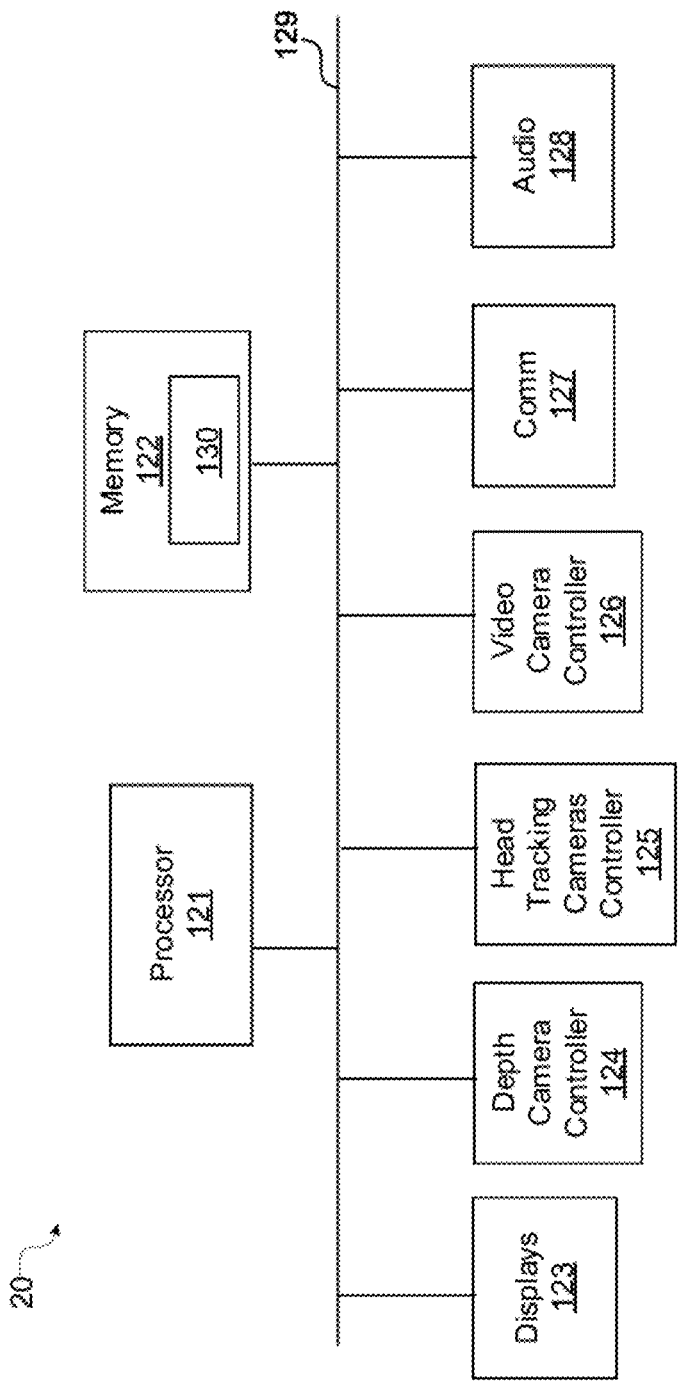
FIG. 18 is a block diagram showing an example of various functional components of an HMD device and/or computer device 12 operating in conjunction therewith.

Referring to FIG. 18, an example of various functional components of the HMD device 20 may include additional components not already discussed above. For example, the functional components of the HMD device 20 include one or more instance of each of the following: a main processor 121, memory 122, transparent display device 123, depth camera controller 124, head tracking cameras controller 125, video camera controller 126, communication device 127, and audio subsystem 128, all coupled together (directly or indirectly) by an interconnect 129. The interconnect 129 may be or include one or more conductive traces, buses, point-to-point connections, controllers, adapters, wireless links and/or other conventional connection devices and/or media, at least some of which may operate independently of each other.

The main processor(s) 121 individually and/or collectively control the overall operation of the HMD device 20 and perform various data processing functions. For example, the processor(s) 121 may provide or at least support the portable holographic user interface features described above. Each processor 121 can be or include, for example, one or more general-purpose programmable microprocessors, digital signal processors (DSPs), graphics processing unit (GPU), mobile application processors, microcontrollers, application specific integrated circuits (ASICs), programmable gate arrays (PGAs), or the like, or a combination of such devices.

Data and instructions (code) 130 that configure the processor(s) 121 to execute aspects of the technique introduced here can be stored in the one or more memories 122. Each memory 122 can be or include one or more physical storage devices, which may be in the form of random access memory (RAM), read-only memory (ROM) (which may be erasable and programmable), flash memory, miniature hard disk drive, conventional hard disk drive, or other suitable type of storage device, or a combination of such devices.

The depth camera(s) controller 124 can apply time-of-flight principles, for example, to determine distances to nearby objects. The distance information acquired by the depth camera controller 124 is used (e.g., by processor(s) 121) to construct a 3D mesh model of the surfaces in the user's environment. The head tracking camera(s) controller 125 enable the HMD device 20 to continuously track the current location and orientation of the user's head by acquiring images of the user's real-world environment. At least some of the functionality associated with surface detection and head tracking may be performed by the processor(s) 121.

The communication device(s) 127 enable the HMD device 20 to receive data and/or commands from, and send data and/or commands to an external processing system, such as a personal computer or game console, although in at least some embodiments the HMD device 20 can operate as a standalone device. Each communication device 127 can be or include, for example, a universal serial bus (USB) adapter, Wi-Fi transceiver, Bluetooth or Bluetooth Low Energy (BLE) transceiver, Ethernet adapter, cable modem, DSL modem, cellular transceiver (e.g., 3G, LTE/4G or 5G), baseband processor, or the like, or a combination thereof. The audio subsystem 128 includes at least one speaker and audio processing circuitry to output sound effects to the user.

As used in this application, the terms "device," "component," "system," and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various examples are described herein in connection with a device, which can be a wired device or a wireless device. A wireless device may be a computer, a gaming device, cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Further, a wired device may include a server operable in a data centers (e.g., cloud computing).

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any example described herein as "exemplary" is not necessarily to be construed as preferred or advantageous over other examples. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various examples described throughout this application that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It should be appreciated to those of ordinary skill that various examples or features are presented in terms of systems that may include a number of devices, components, modules, and the like. It is to be understood and appreciated that the various systems may include additional devices, components, modules, etc., and/or may not include all of the devices, components, modules etc. discussed in connection with the figures.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof specially-designed to perform the functions described herein. A specially programmed general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some examples, the processor and the storage medium may reside in an ASIC. Additionally, the ASIC may reside in transmitter 108. In the alternative, the processor and the storage medium may reside as discrete components in transmitter 108. Additionally, in some examples, the steps and/or actions of a method or algorithm may reside as one or any combination or set of codes and/or instructions on a machine readable medium and/or computer readable medium, which may be incorporated into a computer program product.

In one or more examples, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While examples of the present application have been described in connection with examples thereof, it will be understood by those skilled in the art that variations and modifications of the examples described above may be made without departing from the scope hereof. Other examples will be apparent to those skilled in the art from a consideration of the specification or from a practice in accordance with examples disclosed herein.

What is claimed is:

1. A measurement and schematic-generating system, comprising:
    a measuring tool including:
        a first tool member having a first plurality of fiducial markers that indicate a first point in space relative to the first tool member;
        a second tool member having a second plurality of fiducial markers, wherein each of the second plurality of fiducial markers indicates a respective second point in space relative to the second tool member;
        wherein the first tool member and the second tool member have a plurality of relative positions each having a corresponding relative geometric relationship between the first point and the second point; and
    a head-mounted display device including:
        one or more sensors configured to identify a first geometric position of the first point and one or more second geometric positions of one or more of the respective second points associated with placement of the first tool member and the second tool member relative to a surface of a real-world structure, wherein the first geometric position and the one or more second geometric positions are in a coordinate system relative to the head-mounted display device;

one or more processors configured to generate a final dimension of a part of the real-world structure based on at least the one or more second geometric positions according to relative geometric relationship with respect to the first point; and a near-eye display configured to display a virtual schematic diagram of the real-world structure having the final dimension.

2. The measurement and schematic-generating system of claim 1, wherein each of the second plurality of fiducial markers indicates a measurement from an end of the second tool member to each of the second plurality of fiducial markers.

3. The measurement and schematic-generating system of claim 1, further comprising a connector configured to restrain a relative movement between the first tool member and the second tool member to a known relative movement that defines the relative geometric relationship.

4. The measurement and schematic-generating system of claim 3, wherein the connector comprises at least one internal wall within a body of a first one of the first tool member and the second tool member, wherein the at least one internal wall defines a slot sized to fit at least a part of a body of a remaining one of a second one of the first tool member and the second tool member.

5. The measurement and schematic-generating system of claim 1, further comprising a geometric reference on at least one of the first tool member and the second tool member, wherein the head-mounted display device is configured to identify a current one of the plurality of relative positions of the first tool member and the second tool member based on identifying a position of the geometric reference.

6. The measurement and schematic-generating system of claim 5, wherein the geometric reference comprises one or more internal walls defining a window within a body of the first tool member, wherein the window is sized for displaying one or more of the second plurality of fiducial markers of the second tool member when the second tool member is placed underneath or within a body of the first tool member.

7. The measurement and schematic-generating system of claim 1, wherein the second tool member is substantially straight or substantially arched.

8. The measurement and schematic-generating system of claim 1, further comprising an inclinometer configured to measure an angle of the measuring tool or a surface being measured by the measuring tool.

9. The measurement and schematic-generating system of claim 1, further comprising:
a memory configured to store a profile of a physical geometry of the measuring tool;
wherein the one or more processors are configured to use the profile and an identified one or more of each of the first plurality of fiducial markers and the second plurality of fiducial markers to calculate a current one of the plurality of relative positions between the first tool member and the second tool member.

10. The measurement and schematic-generating system of claim 1, wherein each of the first plurality of fiducial markers and the second plurality of fiducial markers comprise unique markers.

11. A computer-readable medium having instructions stored in a memory that, when executed by one or more processors associated with a head-mounted display device, cause the one or more processors to:
cause one or more sensors to identify:
a first geometric position of a first point in space indicated by a first plurality of fiducial markers of a first tool member of a measurement tool;
one or more second geometric positions of one or more respective second points in space associated with placement of the first tool member and a second tool member of the measurement tool relative to a surface of a real-world structure, wherein the second tool member includes a second plurality of fiducial markers each indicating a respective second point in space relative to the second tool member; and
wherein the first geometric position and the one or more second geometric positions are in a coordinate system relative to the head-mounted display device;
generate a final dimension of a part of the real-world structure based on at least the one or more second geometric positions according to relative geometric relationship with respect to the first point; and
cause a near-eye display configured to display a virtual schematic diagram of the real-world structure having the final dimension.

12. The computer-readable medium of claim 11, wherein each of the second plurality of fiducial markers indicates a measurement from an end of the second tool member to each of the second plurality of fiducial markers.

13. The computer-readable medium of claim 11, wherein a connector is configured to restrain a relative movement between the first tool member and the second tool member to a known relative movement that defines the relative geometric relationship.

14. The computer-readable medium of claim 11, further comprising instructions stored in the memory that, when executed by one or more processors, cause the one or more processors to identify a current one of the plurality of relative positions of the first tool member and the second tool member based on identifying a position of a geometric reference on at least one of the first tool member and the second tool member.

15. The computer-readable medium of claim 11, further comprising instructions stored in the memory that, when executed by one or more processors, cause the one or more processors to:
calculate a current one of the plurality of relative positions between the first tool member and the second tool member based on a profile of a physical geometry and design of the measuring tool in a memory and based on the head-mounted display device identifying one or more of each of the first plurality of fiducial markers and the second plurality of fiducial markers.

16. A method of measuring a dimension of a real-world structure and generating a schematic using a head-mounted display device, comprising:
identifying a first geometric position of a first point in space indicated by a first plurality of fiducial markers of a first tool member of a measurement tool;
identifying one or more second geometric positions of one or more respective second points in space associated with placement of the first tool member and a second tool member of the measurement tool relative to a surface of a real-world structure, wherein the second tool member includes a second plurality of fiducial markers each indicating a respective second point in space relative to the second tool member and wherein the first geometric position and the one or more second geometric positions are in a coordinate system relative to the head-mounted display device;

generating a final dimension of a part of the real-world structure based on at least the one or more second geometric positions according to relative geometric relationship with respect to the first point; and displaying a virtual schematic diagram of the real-world structure having the final dimension.

17. The method of claim 16, wherein each of the second plurality of fiducial markers indicates a measurement from an end of the second tool member to each of the second plurality of fiducial markers.

18. The method of claim 16, wherein a connector is configured to restrain a relative movement between the first tool member and the second tool member to a known relative movement that defines the relative geometric relationship.

19. The method of claim 16, further comprising, prior to generating the final dimension, identifying a current one of the plurality of relative positions of the first tool member and the second tool member based on identifying a position of a geometric reference on at least one of the first tool member and the second tool member.

20. The method of claim 16, further comprising calculating a current one of the plurality of relative positions between the first tool member and the second tool member based on a profile of a physical geometry of the measuring tool stored in a memory and based on the head-mounted display device identifying one or more of each of the first plurality of fiducial markers and the second plurality of fiducial markers.

* * * * *